United States Patent
Abdelmoneum et al.

(10) Patent No.: US 11,990,932 B2
(45) Date of Patent: May 21, 2024

(54) INTELLECTUAL PROPERTY SECURITY LOCKING APPARATUS AND METHOD

(71) Applicant: Intel Corporation, Santa Clara, CA (US)

(72) Inventors: Mohamed A. Abdelmoneum, Portland, OR (US); Nasser Kurd, Portland, OR (US); Thripthi Hegde, Beaverton, OR (US); Narayan Srinivasa, Portland, OR (US); Peter Sagazio, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 634 days.

(21) Appl. No.: 17/132,893

(22) Filed: Dec. 23, 2020

(65) Prior Publication Data
US 2022/0200655 A1    Jun. 23, 2022

(51) Int. Cl.
| | |
|---|---|
| *H04B 1/692* | (2011.01) |
| *H04B 1/7136* | (2011.01) |
| *H04B 1/7143* | (2011.01) |
| *H04B 1/7156* | (2011.01) |
| *H04L 9/08* | (2006.01) |

(52) U.S. Cl.
CPC ......... *H04B 1/7156* (2013.01); *H04B 1/7136* (2013.01); *H04B 1/7143* (2013.01); *H04L 9/0869* (2013.01)

(58) Field of Classification Search
CPC .. H04B 1/7156; H04B 1/7136; H04B 1/7143; H04L 9/0869; G09C 1/00; G06F 7/582; G06F 1/022

USPC .................................................. 375/131, 134
See application file for complete search history.

(56) References Cited

U.S. PATENT DOCUMENTS

| | | | |
|---|---|---|---|
| 7,334,149 B1 * | 2/2008 | Wu ........................... | G06F 1/08 375/130 |
| 7,940,830 B2 * | 5/2011 | Marsili ................ | H04B 1/7136 331/46 |

(Continued)

OTHER PUBLICATIONS

Baumgarten, Alex et al., "Preventing IC Piracy Using Reconfigurable Logic Barriers", IEEE Design & Test of Computers, Jan./Feb. 2010, 10 pgs.

(Continued)

*Primary Examiner* — Don N Vo
(74) *Attorney, Agent, or Firm* — NICHOLSON DE VOS WEBSTER & ELLIOTT LLP

(57) ABSTRACT

A clock buffer or driver is gated pending reception of verifiable crypto keys. These clock buffer or divers remain gated, thus disabling a processor from any meaningful function, till crypto keys are decoded, verified, and applied to the clock buffer or driver. A low frequency pseudorandom frequency hopping time sequence is generated and used for randomizing spread-spectrum to modulate a reference clock (or output clock) of a frequency synthesizer. This hopping time sequence holds the key to unlocking the crypto keys. The PWM modulated crypto keys are carried by the hopping time sequence. To decode the PWM modulated crypto keys, the hopping time sequence is used. The reference clock which is modulated with crypto keys in the spread-spectrum is sent to a decoder (in a processor) along with the hopping time sequence. The crypto keys are decoded and then used to un-gate the clock buffer.

21 Claims, 8 Drawing Sheets

(56) References Cited

U.S. PATENT DOCUMENTS

2019/0068242 A1* 2/2019 Liao ................. H03L 7/093
2021/0242873 A1* 8/2021 Liao ................. H03C 3/0983

OTHER PUBLICATIONS

Guin, Ujjwal et al., "FORTIS: A Comprehensive Solution for Establishing Forward Trust for Protecting IPs and ICs", ACM Transactions on Design Automation of Electronic Systems, vol. 21, No. 4, Article 63, May 2016, 20 pgs.

Harris, Fredric et al., "An Efficient Full Digital Frequency Hopping Demodulator Based on Polyphase Filter Banks", Proceedings of the SDR 11 Technical Conference and Product Exposition, 2011, 5 pgs.

Juretus, Kyle et al., "Synthesis of Hidden State Transitions for Sequential Logic Locking", IEEE Transactions on Computer-Aided Design of Integrated Circuits and Systems, 2020, 13 pgs.

Karaca, T. et al., "Digital pulse-width modulator with spread-spectrum emission reduction", Elekrotechnik & Informationstechnik, 2018, 6 pgs.

Rahman, M. Tanjidur et al., "Defense-in-depth: A recipe for logic locking to prevail", Integration, the VLSI Journal, 2019, 19 pgs.

Rajendran, Jeyavijayan et al., "Fault Analysis-Based Logic Encryption", IEEE Transactions on Computers, vol. 64, No. 2, Feb. 2015, 15 pgs.

Wang, Ruichi et al., "Direct Sequence Spread Spectrum-Based PWM Strategy for Harmonic Reduction and Communication", IEEE Transactions on Power Electronics, vol. 32, No. 6, Jun. 2017, 11 pgs.

Wang, Xiaoxiao et al., "Secure Scan and Test Using Obfuscation Throughout Supply Chain", IEEE Transactions on Computer-Aided Design of Integrated Circuits and Systems, vol. 37, No. 9, Sep. 2018, 14 pgs.

* cited by examiner

INTELLECTUAL PROPERTY SECURITY LOCKING APPARATUS AND METHOD

BACKGROUND

Intellectual property (IP) blocks, such as processor, can be over produced in an untrusted foundry. Unauthorized production of IP blocks can be sold in black markets. Further, unauthorized sale of IP blocks may lead to revenue loss and malfeasance.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
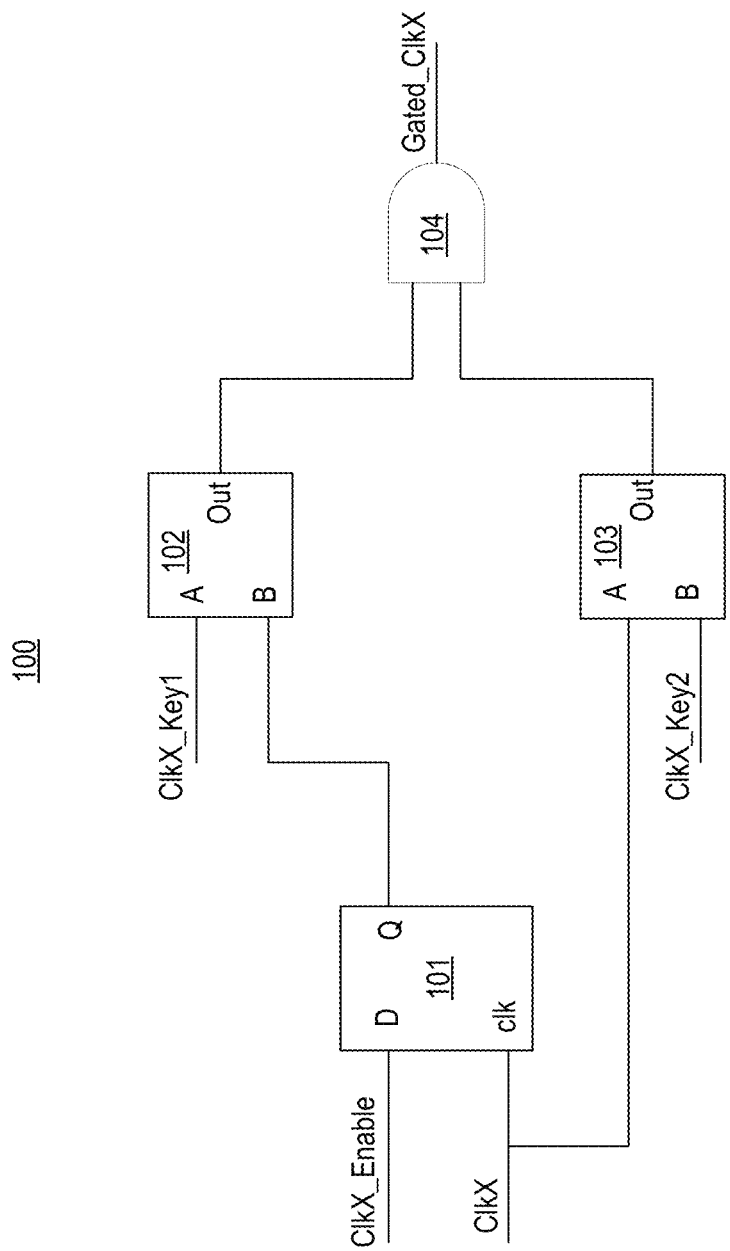
FIG. 1 illustrates a clock gating apparatus with logic to gate or un-gate a clock according to security keys, in accordance with some embodiments.

Some embodiments describe a security mechanism for an intellectual property (IP) block where clock gating logic is enhanced with crypto keys that are used to gate or un-gate a clock even when the clock is enabled by the IP block. The crypto keys are input to one or more logic that allow the clock to propagate if the keys are verified, and gate the clock from propagation in the IP block if the keys are unverified. In some embodiments, the crypto keys are generated by a randomly changing frequency of a carrier wave and encoding a digital code in a pulse width modulated (or duty cycle modulated) signal which is carried by the carrier wave. The randomly changing frequency causes spread-spectrum in the carrier wave. In spread-spectrum, a signal (e.g., an electrical, electromagnetic, or acoustic signal) which becomes a carrier is generated with a particular bandwidth and is randomly spread in the frequency domain, resulting in a signal with a wider bandwidth. This technique allows for establishing a secure communication between the crypto key generator and the clock gating logic that uses the crypto keys. The technique of various embodiments allows side-channel resistance for keys distributed between crypto key generator and any hardware logic that uses crypto keys (instead of secure communications).

While various embodiments are illustrated with reference to clock gating using crypto keys, the embodiments can be expanded to any logic. For example, crypto keys can be used for power gating logic domains, disabling access to cache, disabling access to fuses, controlling multiplexers, controlling state machines, disabling local power supply regulators, etc. The technique of various embodiments also increases resistance to natural interference, noise, and jamming, to prevent detection and to limit power flux density.

In some embodiments, a pulse width modulated (PWM) signal along with a frequency hopping time sequence is sent to the IP block for decoding by a decoder. The frequency hopping time sequence determines the randomness of the spread-spectrum. For example, knowing the frequency hopping time sequence, a decoder can establish the frequency and time stamp the carrier wave was modulated. In various embodiments, the frequency hopping time sequence is a low frequency sequence. Here, low frequency refers to a frequency less than 500 Khz. For example, the frequency hopping time sequence has a frequency of 23 KHz.

In some embodiments, the keys are generated by a crypto engine and these keys are carried over via a clock which undergoes spread-spectrum. In some embodiments, the keys are encoded within the clock by modulating the clock duty cycle at two levels that correspond to logic zero and logic one. For this duty cycle modulation technique, two clock lines (e.g., clockline1 and clockline2) can be used to provide a differential encoding to prevent against side channel attacks, by ensuring duty cycle clock emission are still uniform. For example, encoding uses such as, clockline1: 1→75% 0→25%, and clockline2: 0→75%, 1→5% decoded as value 1, and clockline1: 0→75%, 1→25%, and clockline2: 1→25%, 0→75% will be decoded as value 0. In this example, 25% and 75% represent duty cycles of the clock, while '1' and '0' represent the logic values represented by the duty cycles.

The pseudorandom frequency hopping time sequence is used for randomizing the spread-spectrum instead of using a low frequency triangular or sawtooth wave to modulate a reference clock (and/or an output clock) of the frequency synthesizer. This pseudorandom frequency hopping time sequence holds the key to unlocking the crypto keys. In some embodiments, the PWM crypto keys are carried by the low frequency pseudorandom frequency hopping time sequence which is applied to the clock. To decode the PWM modulated crypto keys, the pseudorandom frequency hopping time sequence is used The frequency hopping time sequence and the clock with the modulated code with spread-spectrum with the frequency hopping time sequence is sent to a decoder. In some embodiments, each bit of the crypto key is transmitted at a specific frequency defined in the frequency hopping time sequence.

In some embodiments, the decoder is part of the IP block. In some embodiments, the decoder is an additional IP which is provided to a verified purchaser or owner of the IP block (or processor) so that the verified purchaser or owner can acquire the crypto keys to enable proper or normal function of the IP block. In some embodiments, the crypto keys are stored in fuses of the IP block for the verified purchaser or owner of the IP block. In some embodiments, the clock gating logic (or drivers) in the IP block use non-standard clock generation devices. In some embodiments, the same clock gating logic are used for generating crypto keys by the crypto engine. For example, different clock gating logic have different crypto keys. Demodulating the clock received by the IP block, decoding the keys for different clock gating logic, and determining the random frequency hopping time sequence provides a multi-level approach to protecting usage of clocks in the IP block.

In some embodiments, a crypto engine is provided which comprises a pseudorandom generator, a frequency synthesizer, and a modulator. The pseudorandom generator generates a frequency hopping time sequence. The frequency synthesizer is coupled to the pseudorandom generator. The frequency synthesizer receives an input clock (e.g., a reference cock) and generate an output clock. In some embodiments, the modulator modulates a code, indicative of one or more keys, on to the input clock via pulse width modulation of the clock duty cycle at the clock frequency hopping time sequence. The one or more keys are used to gate or un-gate a circuitry. In some embodiments, the circuitry includes a clock gating logic. In some embodiments, the one or more keys includes a first key and a second key, wherein the clock gating logic includes a sequential unit, a first XOR or XNOR gate, a second XOR or XNOR gate, and an AND gate or a NAND gate. The sequential unit receives a local clock and an enable. The first XOR or XNOR gate receives an output of the sequential unit and the first key. The second XOR or XNOR gate receives the local clock and the second key. The AND gate or a NAND gate is coupled to an output of the first XOR or XNOR gate and an output of the second XOR or XNOR gate.

In some embodiments, the crypto engine comprises: a first channel to transmit the frequency hopping time sequence to an intellectual property (IP) block; and a second channel to transmit the output clock to the IP block. In some embodiments, the IP block include a decoder to extract the one or more keys from the output clock. In some embodiments, the IP block includes fuses to store the one or more keys and/or the frequency hopping time sequence. In various embodiments, the input clock undergoes spread-spectrum using the frequency hopping time sequence. The frequency hopping time sequence is a low frequency hopping time sequence. The frequency synthesizer comprises a phase locked loop or a frequency locked loop and a pulse width modulator.

There are many technical effects of the various embodiments. For example, the multi-level security mechanism with random spread-spectrum for a carrier wave that carries encoded keys can eliminate (or substantially reduce) the chances of using IP blocks or processors that are over produced in an untrusted foundry. The security mechanism will discourage the unauthorized production of IP blocks for sale in black markets. Revenue loss associated with the unauthorized sale of IP blocks is also eliminated or substantially reduced. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

FIG. 1 illustrates clock gating apparatus 100 with logic to gate or un-gate a clock according to security keys, in accordance with some embodiments. Apparatus 100 comprises sequential logic 101, first logic 102, second logic 103, and AND gate 104. Data input of sequential logic 101 is connected to ClkX_Enable signal, while the clock input (clk) receives clock ClkX. The output 'Q' of sequential logic 101 is input to first logic 102. The second input of first logic 102 receives the first crypto key (ClkX_Key1). The first input of second logic 103 receives ClkX and the second input of second logic 103 receives the second crypto key (ClkX_Key2). In some embodiments, first logic 102 and second logic 103 comprise XOR gates. In other implementations, first logic 102 and second logic 103 can be XNOR gates, XOR gates, multiplexers, state machines, etc. The sequential logic 101 can be a flip-flop or a latch. The output of first logic 102 and second logic 103 are input to AND gate 104 which outputs the gated clock (Gated_ClkX).

Clock gating apparatus 100 can be modified in many ways so long as it retains the function of gating the propagation of ClkX by crypto keys ClkX_Key1 and ClkY_Key2. For example, AND gate 104 can be replaced with a NAND gate, while sequential 101 can be replaced with a scan gadget. When ClkX_Enable is high, the output Q of sequential logic 101 toggles with toggling clock ClkX. However, that toggling output Q and clock ClkX are gated by first and second logic gates 102 and 103, respectively. Once ClkX_Key1 and ClkX_Key2 are enabled, the output AND gate 104 un-gates the clock, and allows Gated_ClkX to toggle (e.g., ClkX is passed through to Gated_ClkX node). Here, node names and signal names are interchangeably used. For example, Gated_ClkX may refer to the gated clock signal or node depending on the context of the sentence.

In various embodiments, propagation of ClkX to Gated_ClkX depends on decoding and verification of crypto keys ClkX_Key1 and CLkX_Key2. A number of mechanisms can be used for generating and transmitting the secure keys ClkX_Key1 and CLkX_Key2. In some embodiments, ClkX_Key1 and CLkX_Key2 are generated, transmitted, and decoded by a same logic or instances of that logic. For example, the scheme for generating the codes for the keys, modulating the clock duty cycle with the codes such that the clock acts as a carrier wave to the code information which may have spread-spectrum, and logic to decode the received data to extract ClkX_Key1 is the same (or different instance of a same logic) as that used for extracting CLkX_Key2. In some embodiments, ClkX_Key1 and CLkX_Key2 are generated, transmitted, and/or decoded by different logic. For example, the scheme for generating the codes for the keys, modulating the codes on to a carrier wave which may have spread-spectrum, and logic to decode the received data to extract ClkX_Key1 is different (e.g., a different mechanism) compared to that used for extracting CLkX_Key2. As such, additional security is established for each Key.

While various embodiments are illustrated with reference to clock gating using crypto keys, the embodiments can be expanded to any logic. For example, crypto keys can be used for power gating logic domains, disabling access to cache, disabling access to fuses, controlling multiplexers, controlling state machines, disabling local power supply regulators, etc.

Figure 2:
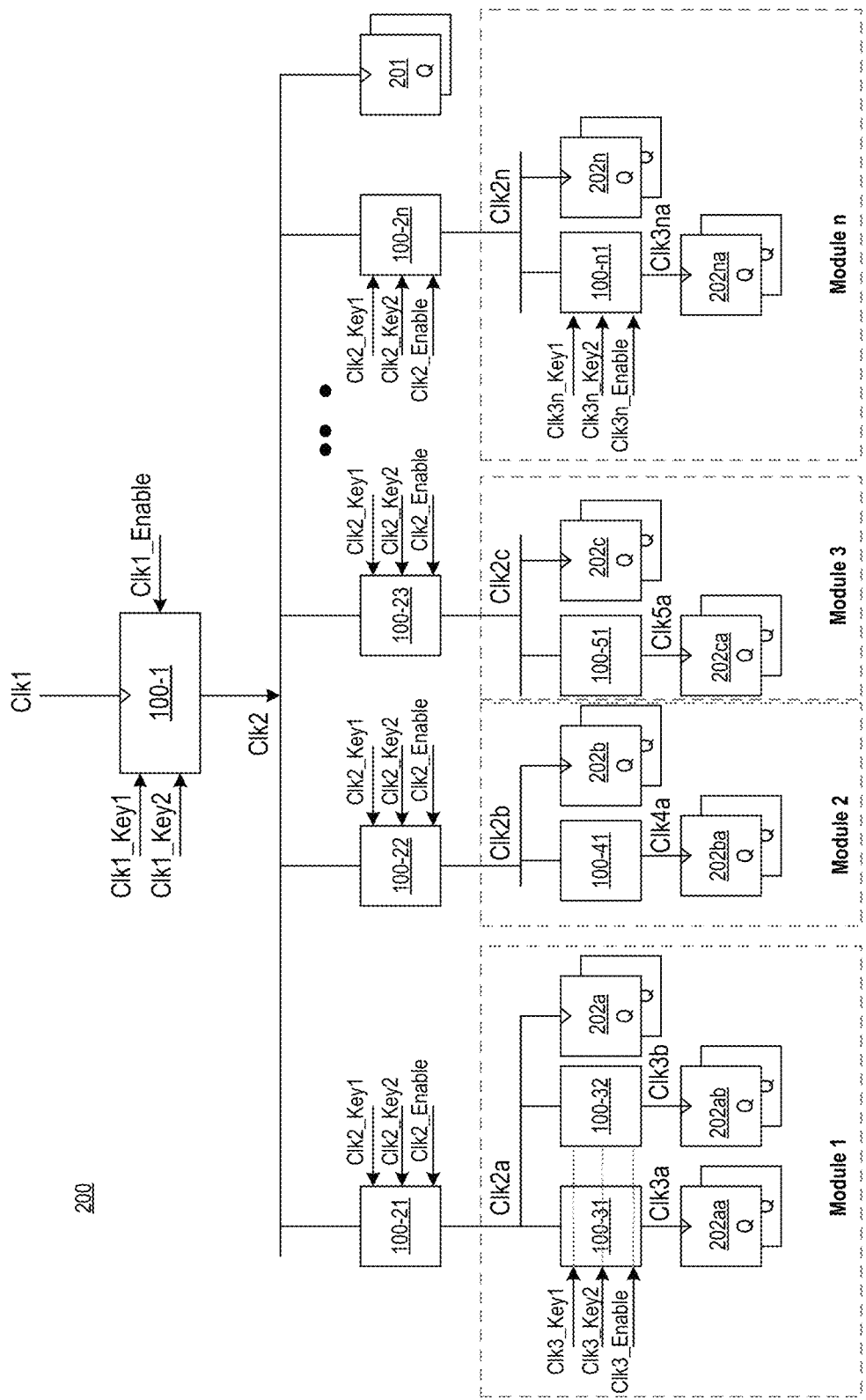
FIG. 2 illustrates a hierarchy of clock gating logic in an intellectual property (IP) block, where the clock gating logic includes logic to gate or un-gate a clock according to security keys, in accordance with some embodiments.

FIG. 2 illustrates hierarchy 200 of clock gating logic in an intellectual property (IP) block, where the clock gating logic includes logic to gate or un-gate a clock according to security keys, in accordance with some embodiments. In some embodiments, clock gating occurs at different levels of hierarchy in an IP block (e.g., a processor). Clk1 is generated by a clock source (e.g., a phase locked loop or frequency locked loop). Clk1 is then distributed down to different logic (e.g., Module 1, Module 2, . . . Module n). In some embodiments, as Clk1 propagates down, it is driven by drivers or buffers that are capable of gating the propagation of Clk1. These drivers or buffers are placed at different levels in the clock distribution network.

For example, clock gate driver 100-1 is placed at the top of the clock distribution, and generates clock Clk2. Clk2 is then provided to some sequential logics directly (e.g., sequential logics 201) and to other clock gate drivers (e.g., 100-21 through 100-2n). In this example, the output clock from clock gate driver 100-21 is Clk2a, the output of clock gate driver 100-22 is clock Clk2b, the output of clock gate driver 100-23 is clock Clk2c, and the output of clock gate driver 100-2n is Clk2n. Each of these clocks (e.g., Clk2a, Clk2b, Clk2c, through Clk2n) is driven down by more clock gate drivers and/or received by sequential logic. In this example, the clocks are received by different modules. For example, Clk2a is received by Module 1 and by clock gate drivers 100-31 and 100-32, and sequential units 100-32 and 202a); Clk2b is received by Module 2 and by clock gate driver 100-41 and sequential unit 202b; Clk2c is received by Module 3 and by clock gate driver 100-51 and sequential unit 202c; and Clk2b is received by Module n and by clock gate driver 100-n1 and sequential unit 202n. The outputs of the clock gate drivers are further distributed down. For example, Clk3a is received by sequential logics 202aa, Clk3b is received by sequential units 202ab, Clk4a is received by sequential logics 202ba, Clk5a is received by sequential logics 202ca, and Clk3na is received by sequential logics 202na.

In some embodiments, the clock gate drivers are gated by different crypto keys. This allows for multiple levels of protection from unauthorized users. If a hacker somehow figures out a frequency hopping time schedule used to apply spread-spectrum for one category of clock gate buffers, then the likelihood of that hacker figuring out the frequency hopping time schedule and the modulated code on the carrier wave becomes low for other clock gate buffers because there are more to decode.

In this example, clock gate buffer 100-1 is gated by Clk1_Key1 and Clk1_Key2. Note, some or all clock gate drivers have their normal enables for managing power consumption. For example, when correct keys Clk1_Key1 and Clk1_Key2 are obtained, Clk2 from clock gate driver 100-1 can still be gated by Clk1_Enable. Likewise, Clk2a from clock gate driver 100-21 can still be gated by Clk2_Enable, Clk2b from clock gate driver 100-22 can still be gated by Clk2_Enable, Clk2c from clock gate driver 100-23 can still be gated by Clk2_Enable, and Clk2n from clock gate driver 100-2n can still be gated by Clk2_Enable. Clk3_Enable is used to gate clock drivers 100-31, 100-41, 100-51, and 100-n1.

Figure 3:
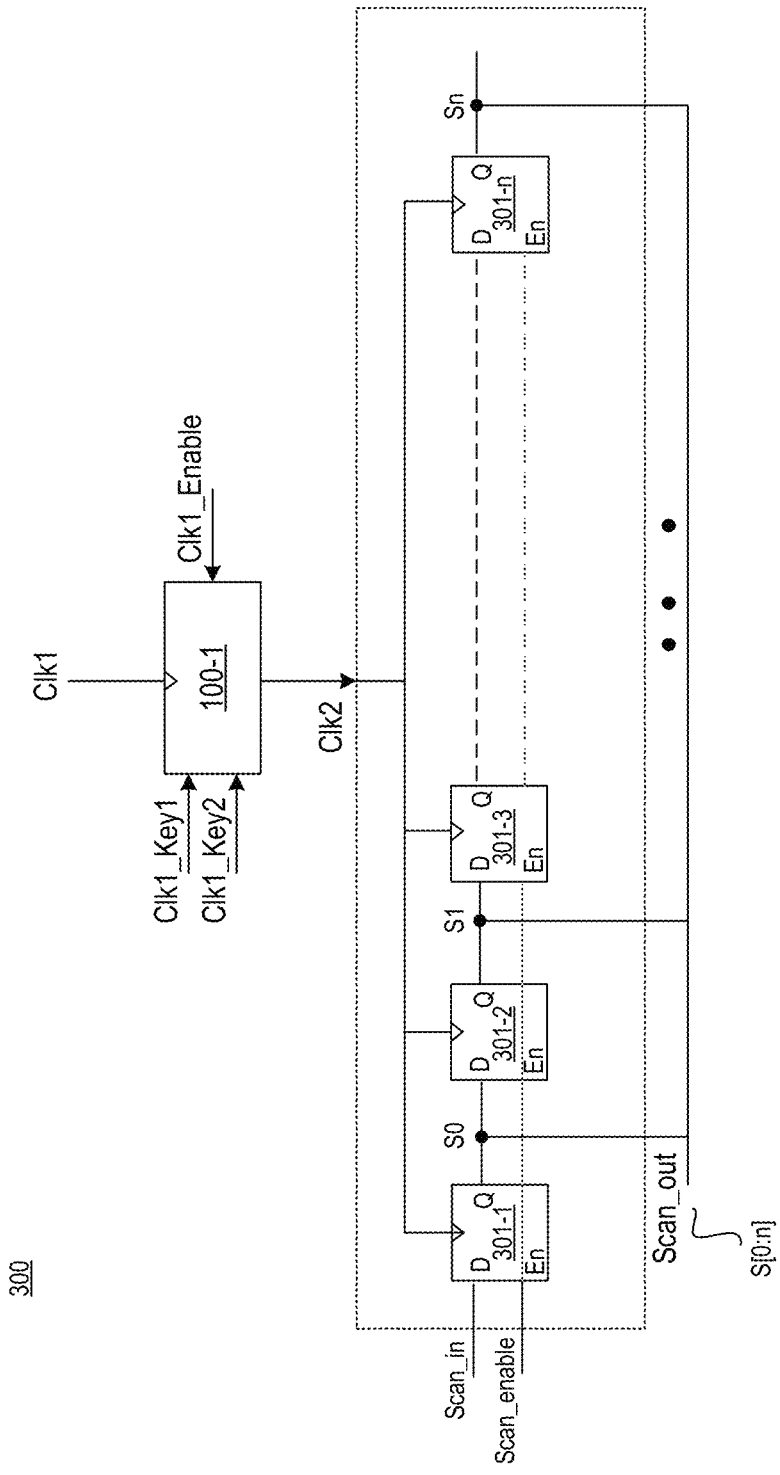
FIG. 3 illustrates a clock gating logic for scan chains, where the clock gating logic includes logic to gate or un-gate a clock according to security keys, in accordance with some embodiments.

FIG. 3 illustrates clock gating logic 300 for scan chains, where the clock gating logic includes logic to gate or un-gate a clock according to security keys, in accordance with some embodiments. In this example, Clk1 is gated by clock driver 100-1. Clk2 is provided as the sampling clock for a chain of registers 301-1, 301-2, 301-3, . . . 301-n, which together form a scan-chain. The input to the scan-chain is Scan_in, which propagates through each register (or sequential unit) when Scan_enable is asserted. The outputs (e.g., S0, S1, . . . Sn) of each register are combined (e.g., S[0:n]) to form a scan output Scan_out. Scan-chains carry data from the processor, and if this data is compromised, it can divulge important aspects of the IP block. The crypto keys (e.g., Clk1_Key1, and Clk1_Key2) can gate propagation of Clk2 (and thus disables the scan-chain) for an unauthorized use of the scan-chain. Similar concepts can be expanded for power gating, and locking or gating of any other logic.

Figure 4:
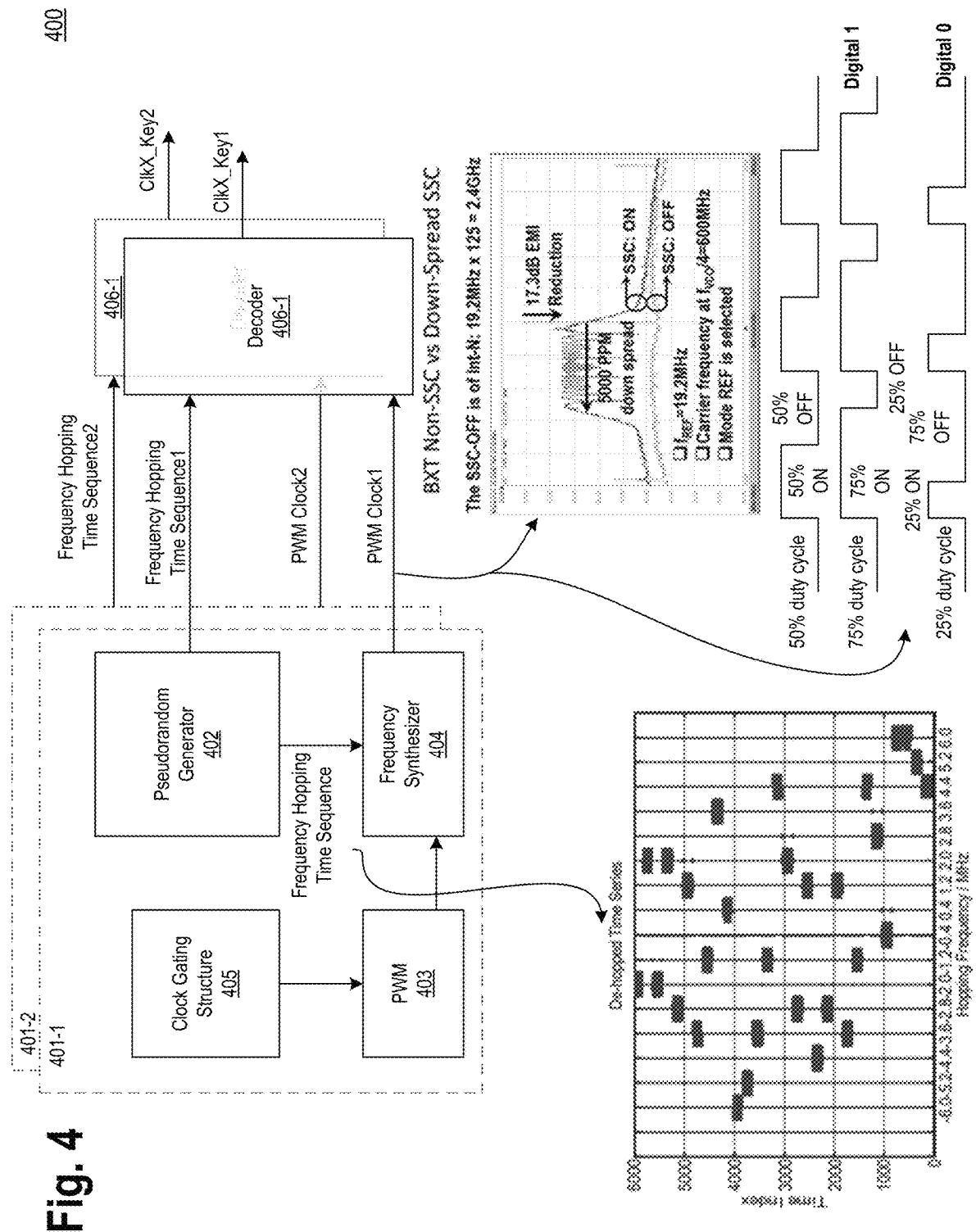
FIG. 4 illustrates an apparatus to generate crypto security keys, wherein the crypto security keys are decoded to subsequently gate or un-gate a clock buffer, in accordance with some embodiments.

FIG. 4 illustrates apparatus 400 to generate crypto security keys, wherein the crypto security keys are decoded to subsequently gate or un-gate a clock buffer, in accordance with some embodiments. Apparatus 400 comprises one or more crypto logic 401 (e.g., 401-1, 401-2). For sake of simplicity, crypto logic is referred by its general label 401 instead of 401-1 and 401-2. In some embodiments, crypto logic 401 comprises pseudorandom generator 402, pulse width modulator (PWM) 403, frequency synthesizer 404, and clock gating structure 405. Pseudorandom number generator 402, also known as a deterministic random bit generator, is an algorithm (hardware and/or software) for generating a sequence of numbers whose properties approximate the properties of sequences of random numbers.

Some embodiments use spread-spectrum modulation of a reference clock (or an output clock) as a means to spread the RF emission across wider band around the clock frequency and to be complaint to the US Federal Communication Commission (FCC) radio remission limits. One way to implement spread-spectrum is to modulate the clock frequency with a very low frequency (e.g., around 23 kHz) in a periodic manner such as a triangle wave or a saw tooth wave. This periodic frequency hopping may be adequate for the purpose of spreading the RF emission over a wide band, but may be tracked by an attacker. For example, an attacker may monitor the RF emission profile of the reference clock and determine that a triangle wave or a saw tooth wave of a certain frequency is being used to institute spread-spectrum.

In some embodiments, spread-spectrum is applied using a frequency hopping time sequence which is random. This random sequence is generated by pseudorandom number generator 402. This random sequence changes randomly for every new key delivery and also changes at random time, to ensure the ephemeral nature of the sequence makes it hard for attacker to use side channel techniques, in accordance with various embodiments. Any suitable random generator may be used for implementing pseudorandom number generator 402. By applying a random frequency hopping time sequence to institute spread-spectrum, it becomes harder for any attacker to figure out the underlying scheme of the spread-spectrum. When a clock (e.g., a reference clock) is encoded with data (e.g., keys for gating a particular clock gating driver) as random frequency hopping time sequence is being instituted for spread-spectrum, the encoded data is hard or nearly impossible to decipher. In some embodiments, crypto keys are generated for a particular clock gating structure 405. If an IP block (e.g., a processor) uses different types of designs for its clock gating driver, separate crypto keys can be generated for each of such clock gating driver.

In some embodiments PWM generator 403 receives a code associated with clock gating structure 405, wherein the code represents the key to be encoded. PWM generator 403 then applies modulation to the reference clock (input to frequency synthesizer 404) or clock being generated by frequency synthesizer 404. This input reference clock (input to frequency synthesizer 404) can be generated by an oscillator (e.g., crystal oscillator) or any other clock source. The PWM generator 403 can use any suitable scheme to encode the code for keys for clock gating structure 405.

In one example, modulating the reference clock (reference clock to frequency synthesizer 404) by 75% indicates encoding of a logic '1' value while modulating the reference clock (reference to frequency synthesizer 404) by 25% indicates encoding of logic '0'. This way, the clock signal (e.g., reference clock to frequency synthesizer 404) and by extension, the output of the frequency synthesizer 404, is carrying the crypto key embedded in the duty cycle with each bit transmitted at frequency defined according to the frequency hopping pattern sequence. Such hopping pattern changes every time a key is generated and transmitted to the clock gate to unlock the IP and enable the clock, in accordance with some embodiments. An attacker is unlikely to sniff the crypto keys without being able to access the hopping pattern in real time to identify the frequency of each bit and extract the duty cycle from the radiated emission.

The output of frequency synthesizer 404 is thus a PWM clock (e.g., PWM clock1 from crypto logic 401, and PWM clock2). The modulation occurs using the frequency hopping pattern sequence at low frequency. In some embodiments, the output clock (PWM clock) from synthesizer 404 is a reference clock for the IP block. For example, the output clock from synthesizer 404 is used as a reference clock for a phase locked loop in the IP block. In some embodiments, the output clock (PWM clock) from synthesizer 404 is a sampling clock used in the IP block.

The outputs of one or more crypto logic 401 are received by decoder 406 (e.g., 406-1 and 406-2) that decode the received data and extract the crypto keys ClkX_Key1, ClkX_Key2. In this example, the frequency hopping time sequence (e.g., frequency hopping time sequence1 and sequence2) are sent to decoder 406 of the IP block along with the reference clock on separate channels (or interconnects). In various embodiments, the encoded code (i.e., the keys) on the PWM clock is decoded by extracting the native clock (after removing the spread spectrum using the frequency hopping time sequence). As such the keys are extracted. In some embodiments, each key is extracted from a decoder. In some embodiments, the pseudorandom sequence (i.e., the frequency hopping time sequence) is transmitted to the IP block using a parallel channel (e.g., parallel to the channel carrying the PWM Clock) that has the encoded crypto keys. In some embodiments, the clock frequency of the PWM Clock or the reference clock to frequency synthesizer 404 is varied with a randomized pattern (from generator 403) that logic 401 can change each time there is a need to enable a clock gate but the keys are not transmitted yet.

Figure 5:
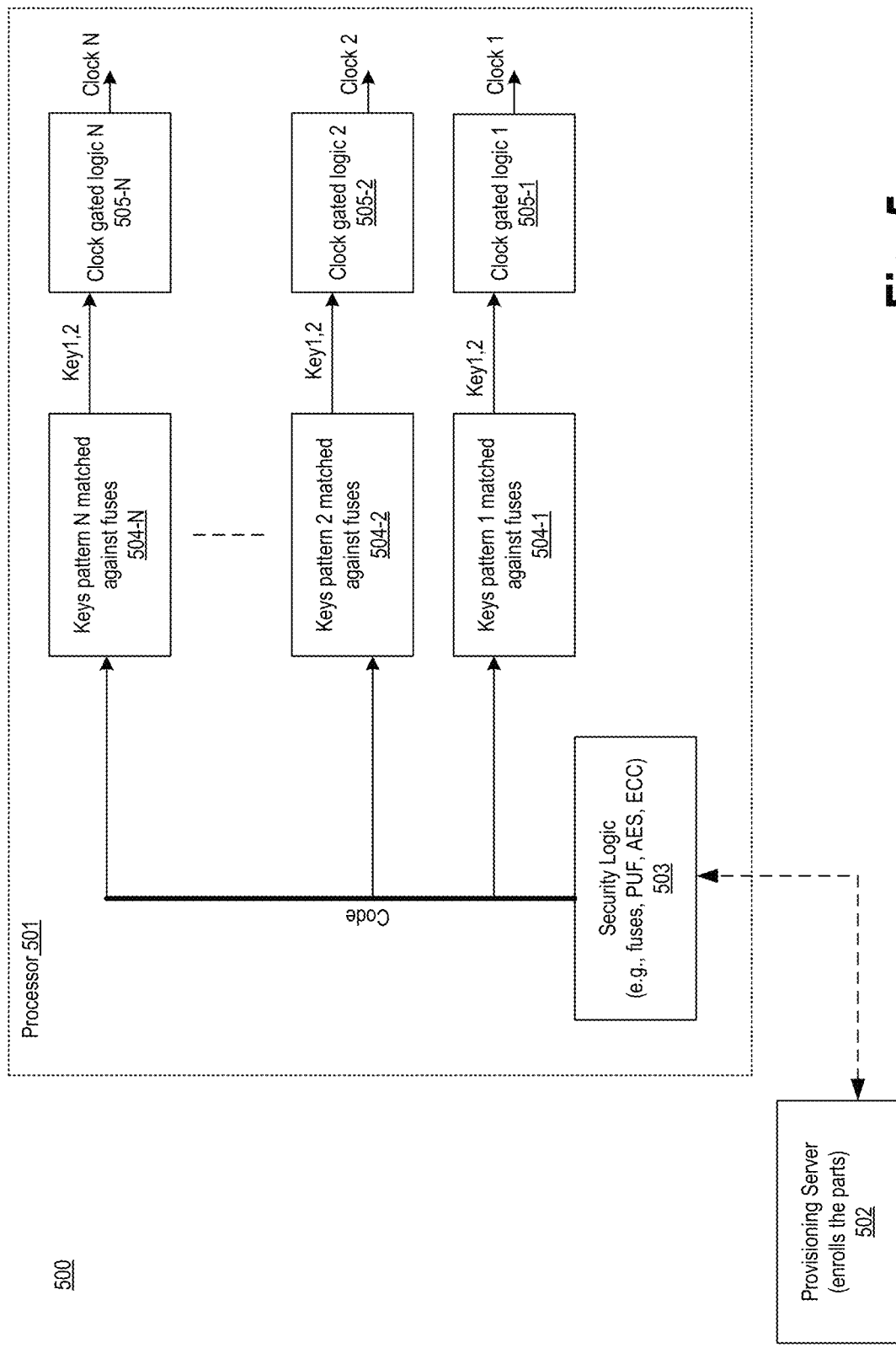
FIG. 5 illustrates an apparatus to decode the crypto security keys stored in fuses, in accordance with some embodiments.

FIG. 5 illustrates apparatus 500 to decode the crypto security keys stored in fuses, in accordance with some embodiments. Apparatus 500 includes processor 501 (e.g., SoC of FIG. 8) and/or provisioning server 502. In some embodiments, provisioning server 502 provides the crypto keys to processor 501 which are stored and/or managed by security logic 503. For example, security logic 503 burns the crypto keys in fuses In some embodiments, security logic 503 comprises circuits with physically unclonable function (PUF) that produce randomized values used as a secret key. The PUF provides unique identification per part which is secret and that is not exposed outside the hardware logic. In some embodiments, security logic 503 comprises Advanced Encryption Standard (AES) used to wrap the keys on die. In some embodiments, an AES engine provides encrypt and/or decrypt operations. In some embodiments, security logic 503 includes an Error Correction Code (ECC) engine to sign and/or verify certificates, and a server certificate.

During manufacturing flow, a server or a platform root of trust on the board, enrolls the public key (key-pair derived from the PUF value) which will be used as the identity of the part (e.g., processor die 501). A secure channel is then established between the server 502 or platform root of trust with the part, to exchange a session key using Elliptic-curve Diffie-Hellman (ECDH) protocol per National Institute of Standards and Technology (NIST) SP800-56A standards. ECDH is a key agreement protocol that allows two parties, each having an elliptic-curve public-private key pair, to establish a shared secret over an insecure channel. This shared secret may be directly used as a key, or to derive another key.

This session key is then used to encrypt the session to allow transmission of keys. In some embodiments, a unique sequence of instructions is sent by server 502 that security logic 503 receives to proceed. These unique sequences of instructions are known merely to server 502 and security logic 503, in accordance with some embodiments. In some embodiments, a PUF derived key is then sent to the server 502 securely encrypted. Server 502 then generates unique keys, which are then burnt into the fuses by security logic 503 wrapped with the same PUF derived key. Any other necessary fusing can be completed at this point or later point. This ends the provisioning process. In some embodiments, merely security logic 503 is allowed to function during provisioning process, and no other logic can be un-gated until provisioning is completed into fuses.

The keys are then decoded and read by different logic units 504-1, 504-2, through 504-N. Each logic provides the keys (Key1, Key2) to the appreciate clock gating logic (e.g., clock gating logic 1 through N that are marked as 505-1, 505-2, through 505-N). The outputs of each clock gating logic are a clock (e.g., Clock 1, Clock2, through Clock N). While the various embodiments are illustrated with clock gating logic or drivers that use two keys, a single key or more than two keys can be used. Further, the embodiments are applicable to any logic that can be locked or gated using one or more crypto keys.

Figure 6:
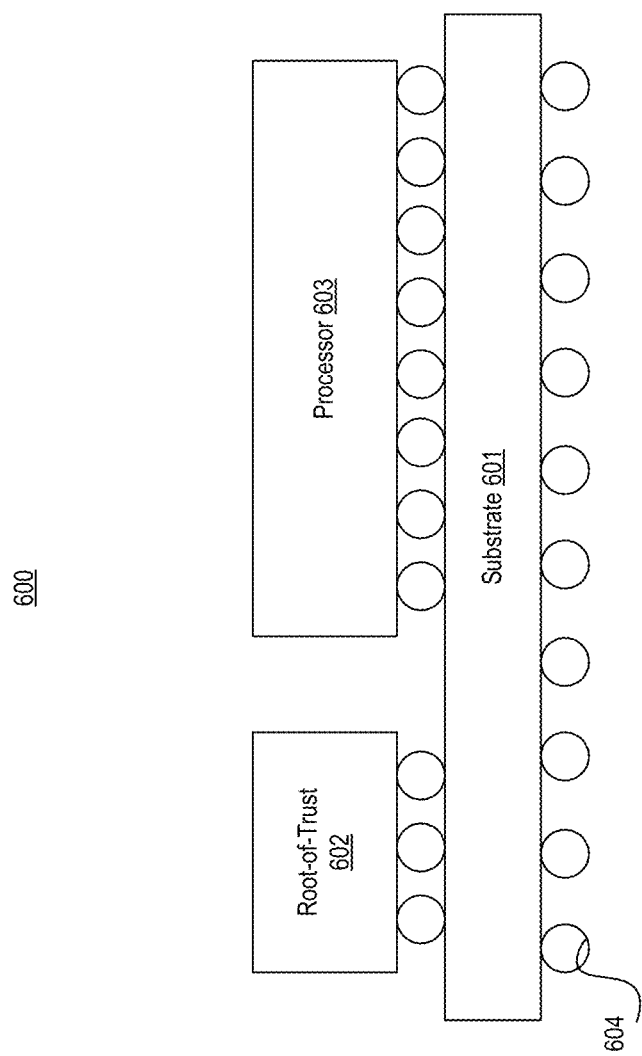
FIG. 6 illustrates a package with a Root-of-Trust (ROT) IP block that provides crypto security keys to a processor or system-on-chip, in accordance with some embodiments.

FIG. 6 illustrates package 600 with a Root-of-Trust (ROT) IP block that provides crypto security keys to a processor or system-on-chip, in accordance with some embodiments. Package 600 comprises substrate 601, Root-of-Trust (ROT) integrated circuit (IC) 602, processor 603 (e.g., SoC of FIG. 8), and solder balls 604. In some embodiments, crypto logic 401 is embedded in ROT IC 602. In some embodiments, when two crypto keys are used, there may be two different ROT ICs, one for each crypto key. In some embodiments, ROT IC 602 can be used to authenticate the system before un-gating the system. In some embodiments, ROT IC 602 is on a motherboard. In some embodiments, ROT IC 602 is on the same package as processor 603. In some embodiments, the function of ROT IC 602 is performed by server 502 which is communicatively coupled to processor 603.

In some embodiments, ROT IC 602 includes pseudorandom generator 402 to generate a frequency hopping time sequence. ROT IC 602 further comprises frequency synthesizer 404 coupled to the pseudorandom generator, wherein the frequency synthesizer receives an input clock and generates an output clock. ROT IC 602 also comprises a modulator to modulate a code, indicative of one or more keys, on to the input clock via the frequency hopping time sequence. In some embodiments, the one or more keys are used to gate or un-gate a circuitry. The circuitry resides in processor 603. In some embodiments, the circuitry includes a clock gating logic. In some embodiments, the one or more keys includes a first key and a second key, wherein the clock gating logic includes: a sequential unit to receive a local clock and an enable; a first XOR or XNOR gate to receive an output of the sequential unit and the first key; a second XOR or XNOR gate to receive the local clock and the second key; and a AND gate or a NAND gate coupled to an output of the first XOR or XNOR gate and an output of the second XOR or XNOR gate.

In some embodiments, ROT IC 602 provides the randomized frequency hopping time sequence and encoded clock (with spread-spectrum) on separate interconnect channels to processor 603. In one example, ROT IC 602 comprises a first channel to transmit the frequency hopping time sequence to processor 603 (which is an example of an IP block); and a second channel to transmit the output clock to processor 603.

In some embodiments, processor 603 includes decoder 406 that decodes the encoded clock using the randomized frequency hopping time sequence and extracts the keys that are then used to gate or un-gate clock drivers. In some embodiments, processor 603 includes fuses to store the one or more keys and/or the frequency hopping time sequence. In some embodiments, the input clock undergoes spread-spectrum using the frequency hopping time sequence. In some embodiments, the frequency hopping time sequence is a low frequency hopping time sequence (e.g., less than 500 kHz).

Having the ROT IC 602 separate from processor 603 further improves the security of processor 603. An unauthorized sale of processor 603 without its corresponding ROT IC 602 will make it difficult for a hacker to hack into processor 603. In some embodiments, ROT IC 602 is manufactured by a separate foundry than processor 603. While various embodiments are illustrated in view of gating clock drivers using the keys, the keys can be used to disable or enable any logic or circuit (analog or digital).

Figure 7:
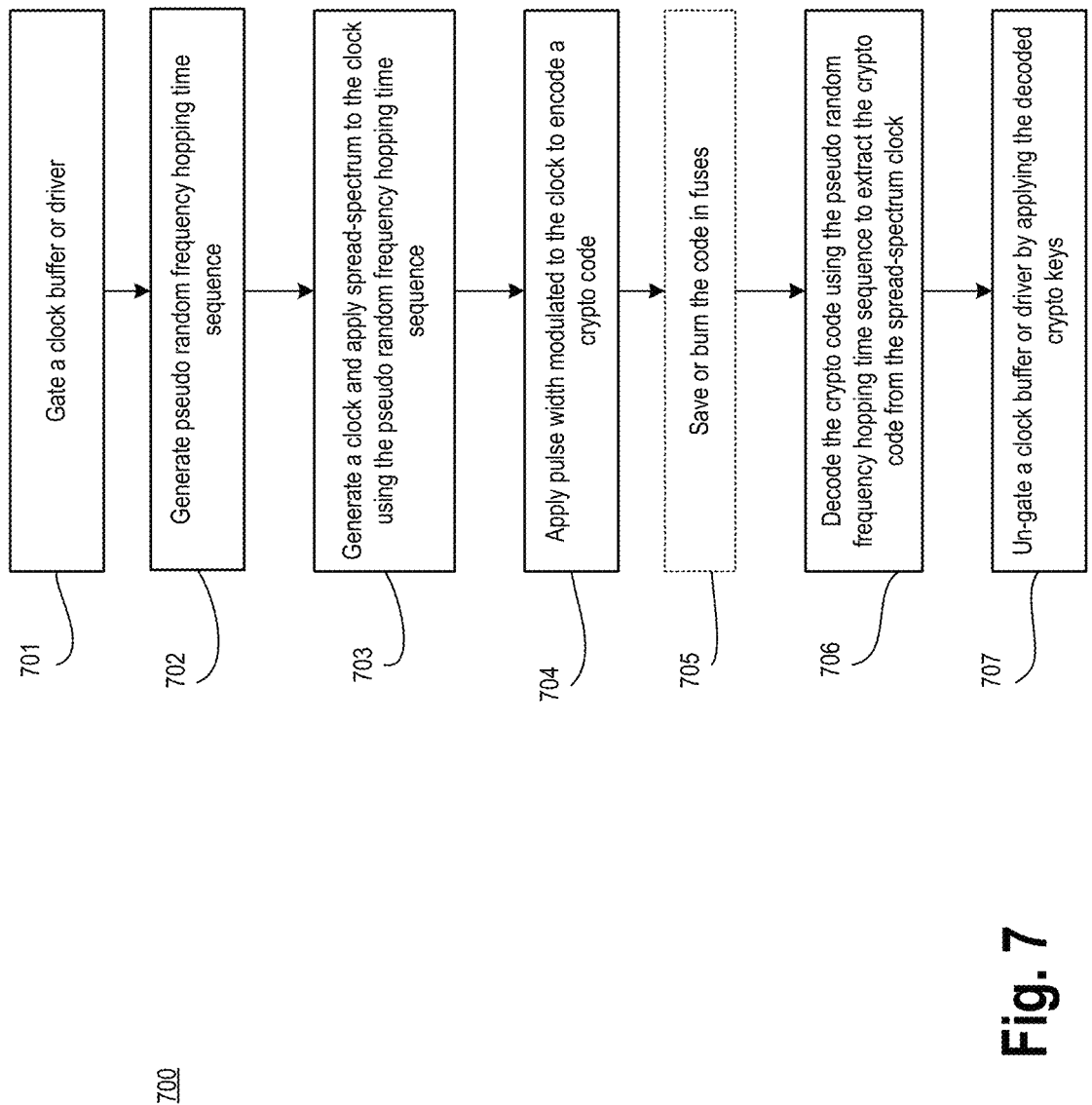
FIG. 7 illustrates a flowchart of method of generating crypto security keys, which are then decoded to gate or un-gate a clock, in accordance with some embodiments.

FIG. 7 illustrates flowchart 700 of method of supplying crypto security keys, which are then decoded to gate or un-gate a clock, in accordance with some embodiments. While the blocks of flowchart 700 are illustrated in a particular order, the order can be modified. For example, some blocks may be performed before others while some blocks may be performed in parallel. In some embodiments, some or all processes of flowchart 700 are performed in software. In some embodiments, some or all processes of flowchart 700 are performed in hardware. In some embodiments, some or all processes of flowchart 700 are performed in a combination of software and hardware. In some embodiments, the processes of flowchart 700 can be performed in one logic.

At block 701, clock buffer or driver is gated pending reception of verifiable keys. For example, clock gate logic or driver 100-1, 100-21, and/or 100-31 are gated (i.e., clock propagation is halted) when the processor (having these clock buffers) is powered up. These clock buffer or divers remain gated, thus disabling the processor from any meaningful function, till crypto keys are decoded, verified, and applied to the clock buffer or driver. As discussed herein, the concept of clock gating using crypto keys can be applied to any logic such as, phase locked loop, frequency locked loop, voltage regulators, access to memory, access to an IO (input-output) logic, transmission by an IO driver, etc. The concept of disabling normal function of the IP block and/or processor using the crypto keys can be implemented for any logic, and not just the clock gate logic or driver.

At block 702, pseudorandom frequency hopping time sequence is generated. The pseudorandom frequency hopping time sequence is used for randomizing the spread-spectrum instead of using a low frequency triangular or sawtooth wave to modulate a reference clock (or output clock) of frequency synthesizer 404. This pseudorandom frequency hopping time sequence holds the key to unlocking the crypto keys. In some embodiments, the PWM modulated crypto keys are carried by the low frequency pseudorandom frequency hopping time sequence. To decode the PWM modulated crypto keys, the pseudorandom frequency hopping time sequence is used.

At block 703, a clock is generated by frequency synthesizer 404, and spread-spectrum is applied to the clock using the pseudorandom frequency hopping time sequence. This clock may be a reference clock for the IP block or processor. The input clock to frequency synthesizer 404 is a reference clock which is used to generate a phase locked or frequency locked output clock. That output clock is further used as a reference clock or a main clock by the IP block or processor. In various embodiments, spread-spectrum is applied to the input reference clock to frequency synthesizer 404 using the pseudorandom frequency hopping time sequence. As such, the output clock of frequency synthesizer 404 shows the effects of spread-spectrum. In some embodiments, in addition to or alternative to applying spread-spectrum to the input reference clock of frequency synthesizer 404, spread-spectrum is applied to the output clock of frequency synthesizer 404.

At block 704, codes representing keys for a particular clock driver are encoded to an input clock (e.g., reference clock) of frequency synthesizer 404. The encoding can be done by duty cycle modulation or pulse width modulation. For example, the PWM modulated crypto keys (modulated by PWM 403 for a particular clock gating structure) are carried by the low frequency pseudorandom frequency hopping time sequence which is modulated on to the input clock of frequency synthesizer 404. To decode the PWM modulated crypto keys, the pseudorandom frequency hopping time sequence is used because the frequency hopping time sequence holds the key to unlocking the crypto keys.

In some embodiments, the decoded or unlocked keys are saved or stored by security logic as indicated by block 705. At block 706, a decoder decodes the crypto code using the pseudorandom frequency hopping time sequence. As such, the keys are extracted. At block 707, the extracted keys are used to un-gate the clock buffer or driver or any logic for which the keys were generated.

Elements of embodiments (e.g., flowcharts with reference various embodiments) are also provided as a machine-readable medium (e.g., memory) for storing the computer-executable instructions (e.g., instructions to implement any other processes discussed herein). In some embodiments, computing platform comprises memory, processor, machine-readable storage media (also referred to as tangible machine-readable medium), communication interface (e.g., wireless or wired interface), and network bus coupled together.

In some embodiments, processor is a Digital Signal Processor (DSP), an Application Specific Integrated Circuit (ASIC), a general-purpose Central Processing Unit (CPU), or a low power logic implementing a simple finite state machine to perform the method with reference to various flowcharts and/or various embodiments, etc.

In some embodiments, the various logic blocks of system are coupled together via a Network Bus. Any suitable protocol may be used to implement the network bus. In some embodiments, machine-readable storage medium includes Instructions (also referred to as the program software code/instructions) for calculating or measuring distance and relative orientation of a device with reference to another device as described with reference to various embodiments and flowchart.

Program software code/instructions associated with flowcharts with reference to various flowcharts and/or various embodiments and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with flowcharts with reference to various flowcharts and/or various embodiments are executed by system.

In some embodiments, the program software code/instructions associated with reference to various flowcharts and/or various embodiments are stored in a computer executable storage medium and executed by the processor. Here, computer executable storage medium is a tangible machine-readable medium that can be used to store program software code/instructions and data that, when executed by a computing device, causes one or more processors to perform a method(s) as may be recited in one or more accompanying claims directed to the disclosed subject matter.

The tangible machine-readable medium may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in the same communication session.

The software program code/instructions (associated with reference to various flowcharts and/or various embodiments) and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, tangible machine readable medium includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

Figure 8:
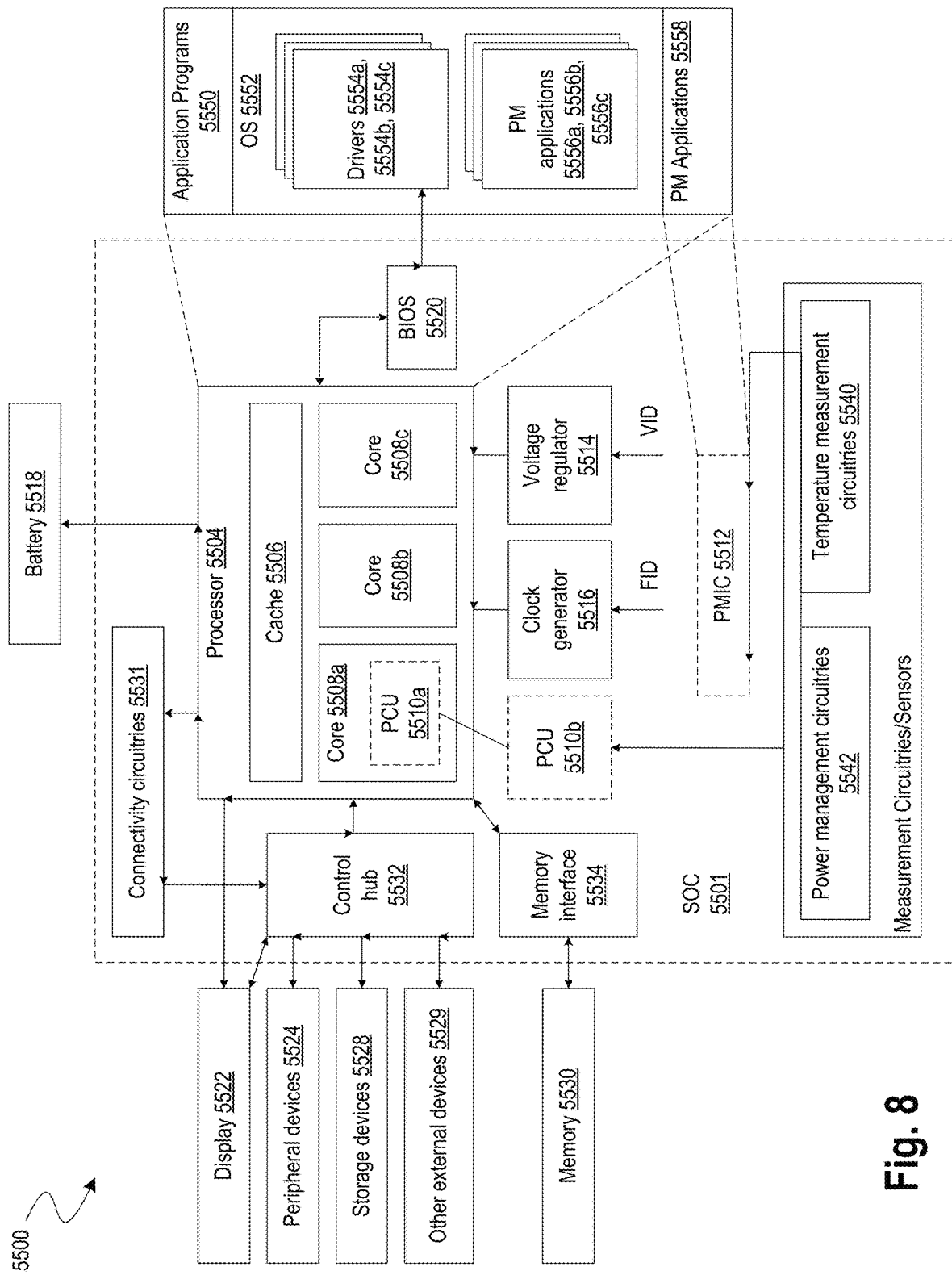
FIG. 8 illustrates a smart device or a computer system or a SoC (System-on-Chip) with clock gating apparatus with logic to gate or un-gate a clock according to security keys, in accordance with some embodiments.

FIG. 8 illustrates a smart device or a computer system or a SoC (System-on-Chip) with gating apparatus with logic to gate or un-gate a signal or supply according to security keys, in accordance with some embodiments. Any of the blocks herein can have the logic to gate or un-gate a clock according to security keys. In some embodiments, the SoC includes the crypto engine to generate the keys for other IP blocks within a platform. It is pointed out that those elements of FIG. 8 having the same reference numbers (or names) as the elements of any other figure may operate or function in any manner similar to that described, but are not limited to such. Any block in this smart device can have the gating apparatus with logic to gate or un-gate a signal or supply.

In some embodiments, device 5500 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 5500.

In an example, the device 5500 comprises an SoC (System-on-Chip) 5501. An example boundary of the SoC 5501 is illustrated using dotted lines in FIG. 8, with some example components being illustrated to be included within SoC 5501—however, SoC 5501 may include any appropriate components of device 5500.

In some embodiments, device 5500 includes processor 5504. Processor 5504 can include one or more physical devices, such as microprocessors, application processors, microcontrollers, programmable logic devices, processing cores, or other processing implementations such as disaggregated combinations of multiple compute, graphics, accelerator, I/O and/or other processing chips. The processing operations performed by processor 5504 include the execution of an operating platform or operating system on which applications and/or device functions are executed. The processing operations include operations related to I/O (input/output) with a human user or with other devices, operations related to power management, operations related to connecting computing device 5500 to another device, and/or the like. The processing operations may also include operations related to audio I/O and/or display I/O.

In some embodiments, processor 5504 includes multiple processing cores (also referred to as cores) 5508a, 5508b, 5508c. Although merely three cores 5508a, 5508b, 5508c are illustrated in FIG. 8, processor 5504 may include any other appropriate number of processing cores, e.g., tens, or even hundreds of processing cores. Processor cores 5508a, 5508b, 5508c may be implemented on a single integrated circuit (IC) chip. Moreover, the chip may include one or more shared and/or private caches, buses or interconnections, graphics and/or memory controllers, or other components.

In some embodiments, processor 5504 includes cache 5506. In an example, sections of cache 5506 may be dedicated to individual cores 5508 (e.g., a first section of cache 5506 dedicated to core 5508a, a second section of cache 5506 dedicated to core 5508b, and so on). In an example, one or more sections of cache 5506 may be shared among two or more of cores 5508. Cache 5506 may be split in different levels, e.g., level 1 (L1) cache, level 2 (L2) cache, level 3 (L3) cache, etc.

In some embodiments, processor core 5504 may include a fetch unit to fetch instructions (including instructions with conditional branches) for execution by the core 5504. The instructions may be fetched from any storage devices such as the memory 5530. Processor core 5504 may also include a decode unit to decode the fetched instruction. For example, the decode unit may decode the fetched instruction into a plurality of micro-operations. Processor core 5504 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 5504 may be an out-of-order processor core in one embodiment. Processor core 5504 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 5504 may also include a bus unit to enable communication between components of processor core 5504 and other components via one or more buses. Processor core 5504 may also include one or more registers to store data accessed by various components of the core 5504 (such as values related to assigned app priorities and/or sub-system states (modes) association.

In some embodiments, device 5500 comprises connectivity circuitries 5531. For example, connectivity circuitries 5531 includes hardware devices (e.g., wireless and/or wired connectors and communication hardware) and/or software components (e.g., drivers, protocol stacks), e.g., to enable device 5500 to communicate with external devices. Device 5500 may be separate from the external devices, such as other computing devices, wireless access points or base stations, etc.

In an example, connectivity circuitries 5531 may include multiple different types of connectivity. To generalize, the connectivity circuitries 5531 may include cellular connectivity circuitries, wireless connectivity circuitries, etc. Cellular connectivity circuitries of connectivity circuitries 5531 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 5531 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 5531 may include a network interface, such as a wired or wireless interface, e.g., so that a system embodiment may be incorporated into a wireless device, for example, a cell phone or personal digital assistant.

In some embodiments, device 5500 comprises control hub 5532, which represents hardware devices and/or software components related to interaction with one or more I/O devices. For example, processor 5504 may communicate with one or more of display 5522, one or more peripheral devices 5524, storage devices 5528, one or more other external devices 5529, etc., via control hub 5532. Control hub 5532 may be a chipset, a Platform Control Hub (PCH), and/or the like.

For example, control hub 5532 illustrates one or more connection points for additional devices that connect to device 5500, e.g., through which a user might interact with the system. For example, devices (e.g., devices 5529) that can be attached to device 5500 include microphone devices, speaker or stereo systems, audio devices, video systems or other display devices, keyboard or keypad devices, or other I/O devices for use with specific applications such as card readers or other devices.

As mentioned above, control hub 5532 can interact with audio devices, display 5522, etc. For example, input through a microphone or other audio device can provide input or commands for one or more applications or functions of device 5500. Additionally, audio output can be provided instead of, or in addition to display output. In another example, if display 5522 includes a touch screen, display 5522 also acts as an input device, which can be at least partially managed by control hub 5532. There can also be additional buttons or switches on computing device 5500 to provide I/O functions managed by control hub 5532. In one embodiment, control hub 5532 manages devices such as accelerometers, cameras, light sensors or other environmental sensors, or other hardware that can be included in device 5500. The input can be part of direct user interaction, as well as providing environmental input to the system to influence its operations (such as filtering for noise, adjusting displays for brightness detection, applying a flash for a camera, or other features).

In some embodiments, control hub 5532 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 5522 represents hardware (e.g., display devices) and software (e.g., drivers) components that provide a visual and/or tactile display for a user to interact with device 5500. Display 5522 may include a display interface, a display screen, and/or hardware device used to provide a display to a user. In some embodiments, display 5522 includes a touch screen (or touch pad) device that provides both output and input to a user. In an example, display 5522 may communicate directly with the processor 5504. Display 5522 can be one or more of an internal display device, as in a mobile electronic device or a laptop device or an external display device attached via a display interface (e.g., DisplayPort, etc.). In one embodiment display 5522 can be a head mounted display (HMD) such as a stereoscopic display device for use in virtual reality (VR) applications or augmented reality (AR) applications.

In some embodiments, and although not illustrated in the figure, in addition to (or instead of) processor 5504, device 5500 may include Graphics Processing Unit (GPU) comprising one or more graphics processing cores, which may control one or more aspects of displaying contents on display 5522.

Control hub 5532 (or platform controller hub) may include hardware interfaces and connectors, as well as software components (e.g., drivers, protocol stacks) to make peripheral connections, e.g., to peripheral devices 5524.

It will be understood that device 5500 could both be a peripheral device to other computing devices, as well as have peripheral devices connected to it. Device 5500 may have a "docking" connector to connect to other computing devices for purposes such as managing (e.g., downloading and/or uploading, changing, synchronizing) content on device 5500. Additionally, a docking connector can allow device 5500 to connect to certain peripherals that allow computing device 5500 to control content output, for example, to audiovisual or other systems.

In addition to a proprietary docking connector or other proprietary connection hardware, device 5500 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 5531 may be coupled to control hub 5532, e.g., in addition to, or instead of, being coupled directly to the processor 5504. In some embodiments, display 5522 may be coupled to control hub 5532, e.g., in addition to, or instead of, being coupled directly to processor 5504.

In some embodiments, device 5500 comprises memory 5530 coupled to processor 5504 via memory interface 5534. Memory 5530 includes memory devices for storing information in device 5500.

In some embodiments, memory 5530 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 5530 can be a dynamic random-access memory (DRAM) device, a static random-access memory (SRAM) device, flash memory device, phase-change memory device, or some other memory device having suitable performance to serve as process memory. In one embodiment, memory 5530 can operate as system memory for device 5500, to store data and instructions for use when the one or more processors 5504 executes an application or process. Memory 5530 can store application data, user data, music, photos, documents, or other data, as well as system data (whether long-term or temporary) related to the execution of the applications and functions of device 5500.

Elements of various embodiments and examples are also provided as a machine-readable medium (e.g., memory 5530) for storing the computer-executable instructions (e.g., instructions to implement any other processes discussed herein). The machine-readable medium (e.g., memory 5530) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 5500 comprises temperature measurement circuitries 5540, e.g., for measuring temperature of various components of device 5500. In an example, temperature measurement circuitries 5540 may be embedded, or coupled or attached to various components, whose temperature are to be measured and monitored. For example, temperature measurement circuitries 5540 may measure temperature of (or within) one or more of cores 5508a, 5508b, 5508c, voltage regulator 5514, memory 5530, a motherboard of SoC 5501, and/or any appropriate component of device 5500. In some embodiments, temperature measurement circuitries 5540 include a low power hybrid reverse (LPHR) bandgap reference (BGR) and digital temperature sensor (DTS), which utilizes subthreshold metal oxide semiconductor (MOS) transistor and the PNP parasitic Bi-polar Junction Transistor (BJT) device to form a reverse BGR that serves as the base for configurable BGR or DTS operating modes. The LPHR architecture uses low-cost MOS transistors and the standard parasitic PNP device. Based on a reverse bandgap voltage, the LPHR can work as a configurable BGR. By comparing the configurable BGR with the scaled base-emitter voltage, the circuit can also perform as a DTS with a linear transfer function with single-temperature trim for high accuracy.

In some embodiments, device 5500 comprises power measurement circuitries 5542, e.g., for measuring power consumed by one or more components of the device 5500. In an example, in addition to, or instead of, measuring power, the power measurement circuitries 5542 may measure voltage and/or current. In an example, the power measurement circuitries 5542 may be embedded, or coupled or attached to various components, whose power, voltage, and/or current consumption are to be measured and monitored. For example, power measurement circuitries 5542 may measure power, current and/or voltage supplied by one or more voltage regulators 5514, power supplied to SoC 5501, power supplied to device 5500, power consumed by processor 5504 (or any other component) of device 5500, etc.

In some embodiments, device 5500 comprises one or more voltage regulator circuitries, generally referred to as voltage regulator (VR) 5514. VR 5514 generates signals at appropriate voltage levels, which may be supplied to operate any appropriate components of the device 5500. Merely as an example, VR 5514 is illustrated to be supplying signals to processor 5504 of device 5500. In some embodiments, VR 5514 receives one or more Voltage Identification (VID) signals, and generates the voltage signal at an appropriate level, based on the VID signals. Various type of VRs may be utilized for the VR 5514. For example, VR 5514 may include a "buck" VR, "boost" VR, a combination of buck and boost VRs, low dropout (LDO) regulators, switching DC-DC regulators, constant-on-time controller-based DC-DC regulator, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 5510*a/b* and/or PMIC 5512. In some embodiments, each core has a network of distributed LDOs to provide efficient control for power management. The LDOs can be digital, analog, or a combination of digital or analog LDOs. In some embodiments, VR 5514 includes current tracking apparatus to measure current through power supply rail(s).

In some embodiments, VR 5514 includes a digital control scheme to manage states of a proportional-integral-derivative (PID) filter (also known as a digital Type-III compensator). The digital control scheme controls the integrator of the PID filter to implement non-linear control of saturating the duty cycle during which the proportional and derivative terms of the PID are set to 0 while the integrator and its internal states (previous values or memory) is set to a duty cycle that is the sum of the current nominal duty cycle plus a deltaD. The deltaD is the maximum duty cycle increment that is used to regulate a voltage regulator from ICCmin to ICCmax and is a configuration register that can be set post silicon. A state machine moves from a non-linear all ON state (which brings the output voltage Vout back to a regulation window) to an open loop duty cycle which maintains the output voltage slightly higher than the required reference voltage Vref. After a certain period in this state of open loop at the commanded duty cycle, the state machine then ramps down the open loop duty cycle value until the output voltage is close to the Vref commanded. As such, output chatter on the output supply from VR 5514 is completely eliminated (or substantially eliminated) and there is merely a single undershoot transition which could lead to a guaranteed Vmin based on a comparator delay and the di/dt of the load with the available output decoupling capacitance.

In some embodiments, VR 5514 includes a separate self-start controller, which is functional without fuse and/or trim information. The self-start controller protects VR 5514 against large inrush currents and voltage overshoots, while being capable of following a variable VID (voltage identification) reference ramp imposed by the system. In some embodiments, the self-start controller uses a relaxation oscillator built into the controller to set the switching frequency of the buck converter. The oscillator can be initialized using either a clock or current reference to be close to a desired operating frequency. The output of VR 5514 is coupled weakly to the oscillator to set the duty cycle for closed loop operation. The controller is naturally biased such that the output voltage is always slightly higher than the set point, eliminating the need for any process, voltage, and/or temperature (PVT) imposed trims.

In some embodiments, device 5500 comprises one or more clock generator circuitries, generally referred to as clock generator 5516. Clock generator 5516 generates clock signals at appropriate frequency levels, which may be supplied to any appropriate components of device 5500. Merely as an example, clock generator 5516 is illustrated to be supplying clock signals to processor 5504 of device 5500. In some embodiments, clock generator 5516 receives one or more Frequency Identification (FID) signals, and generates the clock signals at an appropriate frequency, based on the FID signals.

In some embodiments, device 5500 comprises battery 5518 supplying power to various components of device 5500. Merely as an example, battery 5518 is illustrated to be supplying power to processor 5504. Although not illustrated in the figures, device 5500 may comprise a charging circuitry, e.g., to recharge the battery, based on Alternating Current (AC) power supply received from an AC adapter.

In some embodiments, battery 5518 periodically checks an actual battery capacity or energy with charge to a preset voltage (e.g., 4.1 V). The battery then decides of the battery capacity or energy. If the capacity or energy is insufficient, then an apparatus in or associated with the battery slightly increases charging voltage to a point where the capacity is sufficient (e.g. from 4.1 V to 4.11 V). The process of periodically checking and slightly increase charging voltage is performed until charging voltage reaches specification limit (e.g., 4.2 V). The scheme described herein has benefits such as battery longevity can be extended, risk of insufficient energy reserve can be reduced, burst power can be used as long as possible, and/or even higher burst power can be used.

In some embodiments, battery 5518 is a multi-battery system with workload dependent load-sharing mechanism. The mechanism is an energy management system that operates in three modes—energy saving mode, balancer mode, and turbo mode. The energy saving mode is a normal mode where the multiple batteries (collectively shown as battery 5518) provide power to their own set of loads with least resistive dissipation. In balancing mode, the batteries are connected through switches operating in active mode so that the current shared is inversely proportion to the corresponding battery state-of-charge. In turbo mode, both batteries are connected in parallel through switches (e.g., on-switches) to provide maximum power to a processor or load. In some embodiments, battery 5518 is a hybrid battery which comprising a fast charging battery and a high energy density battery. Fast charging battery (FC) means a battery capable of faster charging than high energy density battery (HE). FC may be today's Li-ion battery as it is capable of faster charging than HE. In some embodiments, a controller (part of battery 5518) optimizes the sequence and charging rate for the hybrid battery to maximize both the charging current and charging speed of the battery, while enabling longer battery life.

In some embodiments, the charging circuitry (e.g., 5518) comprises a buck-boost converter. This buck-boost converter comprises DrMOS or DrGaN devices used in place of half-bridges for traditional buck-boost converters. Various embodiments here are described with reference to DrMOS. However, the embodiments are applicable to DrGaN. The DrMOS devices allow for better efficiency in power conversion due to reduced parasitic and optimized MOSFET packaging. Since the dead-time management is internal to the DrMOS, the dead-time management is more accurate than for traditional buck-boost converters leading to higher efficiency in conversion. Higher frequency of operation allows for smaller inductor size, which in turn reduces the z-height of the charger comprising the DrMOS based buck-boost converter. The buck-boost converter of various embodiments comprises dual-folded bootstrap for DrMOS devices. In some embodiments, in addition to the traditional bootstrap capacitors, folded bootstrap capacitors are added that cross-couple inductor nodes to the two sets of DrMOS switches.

In some embodiments, device 5500 comprises Power Control Unit (PCU) 5510 (also referred to as Power Management Unit (PMU), Power Management Controller (PMC), Power Unit (p-unit), etc.). In an example, some sections of PCU 5510 may be implemented by one or more processing cores 5508, and these sections of PCU 5510 are symbolically illustrated using a dotted box and labelled PCU 5510a. In an example, some other sections of PCU 5510 may be implemented outside the processing cores 5508, and these sections of PCU 5510 are symbolically illustrated using a dotted box and labelled as PCU 5510b. PCU 5510 may implement various power management operations for device 5500. PCU 5510 may include hardware interfaces, hardware circuitries, connectors, registers, etc., as well as software components (e.g., drivers, protocol stacks), to implement various power management operations for device 5500.

In various embodiments, PCU or PMU 5510 is organized in a hierarchical manner forming a hierarchical power management (HPM). HPM of various embodiments builds a capability and infrastructure that allows for package level management for the platform, while still catering to islands of autonomy that might exist across the constituent die in the package. HPM does not assume a pre-determined mapping of physical partitions to domains. An HPM domain can be aligned with a function integrated inside a dielet, to a dielet boundary, to one or more dielets, to a companion die, or even a discrete CXL device. HPM addresses integration of multiple instances of the same die, mixed with proprietary functions or 3rd party functions integrated on the same die or separate die, and even accelerators connected via CXL (e.g., Flexbus) that may be inside the package, or in a discrete form factor.

HPM enables designers to meet the goals of scalability, modularity, and late binding. HPM also allows PMU functions that may already exist on other dice to be leveraged, instead of being disabled in the flat scheme. HPM enables management of any arbitrary collection of functions independent of their level of integration. HPM of various embodiments is scalable, modular, works with symmetric multi-chip processors (MCPs), and works with asymmetric MCPs. For example, HPM does not need a signal PM controller and package infrastructure to grow beyond reasonable scaling limits. HPM enables late addition of a die in a package without the need for change in the base die infrastructure. HPM addresses the need of disaggregated solutions having dies of different process technology nodes coupled in a single package. HPM also addresses the needs of companion die integration solutions—on and off package.

In various embodiments, each die (or dielet) includes a power management unit (PMU) or p-unit. For example, processor dies can have a supervisor p-unit, supervisee p-unit, or a dual role supervisor/supervisee p-unit. In some embodiments, an I/O die has its own dual role p-unit such as supervisor and/or supervisee p-unit. The p-units in each die can be instances of a generic p-unit. In one such example, all p-units have the same capability and circuits, but are configured (dynamically or statically) to take a role of a supervisor, supervisee, and/or both. In some embodiments, the p-units for compute dies are instances of a compute p-unit while p-units for IO dies are instances of an IO p-unit different from the compute p-unit. Depending on the role, p-unit acquires specific responsibilities to manage power of the multichip module and/or computing platform. While various p-units are described for dies in a multichip module or system-on-chip, a p-unit can also be part of an external device such as I/O device.

Here, the various p-units do not have to be the same. The HPM architecture can operate very different types of p-units. One common feature for the p-units is that they are expected to receive HPM messages and are expected to be able to comprehend them. In some embodiments, the p-unit of IO dies may be different than the p-unit of the compute dies. For example, the number of register instances of each class of register in the IO p-unit is different than those in the p-units of the compute dies. An IO die has the capability of being an HPM supervisor for CXL connected devices, but compute die may not need to have that capability. The IO and computes dice also have different firmware flows and possibly different firmware images. These are choices that an implementation can make. An HPM architecture can choose to have one superset firmware image and selectively execute flows that are relevant to the die type the firmware is associated with. Alternatively, there can be a customer firmware for each p-unit type; it can allow for more streamlined sizing of the firmware storage requirements for each p-unit type.

The p-unit in each die can be configured as a supervisor p-unit, supervisee p-unit or with a dual role of supervisor/supervisee. As such, p-units can perform roles of supervisor or supervisee for various domains. In various embodiments, each instance of p-unit is capable of autonomously managing local dedicated resources and contains structures to aggregate data and communicate between instances to enable shared resource management by the instance configured as the shared resource supervisor. A message and wire-based infrastructure is provided that can be duplicated and configured to facilitate management and flows between multiple p-units.

In some embodiments, power and thermal thresholds are communicated by a supervisor p-unit to supervisee p-units. For example, a supervisor p-unit learns of the workload (present and future) of each die, power measurements of each die, and other parameters (e.g., platform level power boundaries) and determines new power limits for each die. These power limits are then communicated by supervisor p-units to the supervisee p-units via one or more interconnects and fabrics. In some embodiments, a fabric indicates a group of fabrics and interconnect including a first fabric, a second fabric, and a fast response interconnect. In some embodiments, the first fabric is used for common communication between a supervisor p-unit and a supervisee p-unit. These common communications include change in voltage, frequency, and/or power state of a die which is planned based on a number of factors (e.g., future workload, user behavior, etc.). In some embodiments, the second fabric is used for higher priority communication between supervisor p-unit and supervisee p-unit. Example of higher priority communication include a message to throttle because of a possible thermal runaway condition, reliability issue, etc. In some embodiments, a fast response interconnect is used for communicating fast or hard throttle of all dies. In this case, a supervisor p-unit may send a fast throttle message to all other p-units, for example. In some embodiments, a fast response interconnect is a legacy interconnect whose function can be performed by the second fabric.

The HPM architecture of various embodiments enables scalability, modularity, and late binding of symmetric and/or asymmetric dies. Here, symmetric dies are dies of same size, type, and/or function, while asymmetric dies are dies of different size, type, and/or function. Hierarchical approach also allows PMU functions that may already exist on other dice to be leveraged, instead of being disabled in the traditional flat power management scheme. HPM does not assume a pre-determined mapping of physical partitions to domains. An HPM domain can be aligned with a function integrated inside a dielet, to a dielet boundary, to one or more dielets, to a companion die, or even a discrete CXL device. HPM enables management of any arbitrary collection of functions independent of their level of integration. In some embodiments, a p-unit is declared a supervisor p-unit based on one or more factors. These factors include memory size, physical constraints (e.g., number of pin-outs), and locations of sensors (e.g., temperature, power consumption, etc.) to determine physical limits of the processor.

The HPM architecture of various embodiments, provides a means to scale power management so that a single p-unit instance does not need to be aware of the entire processor. This enables power management at a smaller granularity and improves response times and effectiveness. Hierarchical structure maintains a monolithic view to the user. For example, at an operating system (OS) level, HPM architecture gives the OS a single PMU view even though the PMU is physically distributed in one or more supervisor-supervisee configurations.

In some embodiments, the HPM architecture is centralized where one supervisor controls all supervisees. In some embodiments, the HPM architecture is decentralized, wherein various p-units in various dies control overall power management by peer-to-peer communication. In some embodiments, the HPM architecture is distributed where there are different supervisors for different domains. One example of a distributed architecture is a tree-like architecture.

In some embodiments, device 5500 comprises Power Management Integrated Circuit (PMIC) 5512, e.g., to implement various power management operations for device 5500. In some embodiments, PMIC 5512 is a Reconfigurable Power Management ICs (RPMICs) and/or an IMVP (Intel® Mobile Voltage Positioning). In an example, the PMIC is within an IC die separate from processor 5504. The may implement various power management operations for device 5500. PMIC 5512 may include hardware interfaces, hardware circuitries, connectors, registers, etc., as well as software components (e.g., drivers, protocol stacks), to implement various power management operations for device 5500.

In an example, device 5500 comprises one or both PCU 5510 or PMIC 5512. In an example, any one of PCU 5510 or PMIC 5512 may be absent in device 5500, and hence, these components are illustrated using dotted lines.

Various power management operations of device 5500 may be performed by PCU 5510, by PMIC 5512, or by a combination of PCU 5510 and PMIC 5512. For example, PCU 5510 and/or PMIC 5512 may select a power state (e.g., P-state) for various components of device 5500. For example, PCU 5510 and/or PMIC 5512 may select a power state (e.g., in accordance with the ACPI (Advanced Configuration and Power Interface) specification) for various components of device 5500. Merely as an example, PCU 5510 and/or PMIC 5512 may cause various components of the device 5500 to transition to a sleep state, to an active state, to an appropriate C state (e.g., C0 state, or another appropriate C state, in accordance with the ACPI specification), etc. In an example, PCU 5510 and/or PMIC 5512 may control a voltage output by VR 5514 and/or a frequency of a clock signal output by the clock generator, e.g., by outputting the VID signal and/or the FID signal, respectively. In an example, PCU 5510 and/or PMIC 5512 may control battery power usage, charging of battery 5518, and features related to power saving operation.

The clock generator 5516 can comprise a phase locked loop (PLL), frequency locked loop (FLL), or any suitable clock source. In some embodiments, each core of processor 5504 has its own clock source. As such, each core can operate at a frequency independent of the frequency of operation of the other core. In some embodiments, PCU 5510 and/or PMIC 5512 performs adaptive or dynamic frequency scaling or adjustment. For example, clock frequency of a processor core can be increased if the core is not operating at its maximum power consumption threshold or limit. In some embodiments, PCU 5510 and/or PMIC 5512 determines the operating condition of each core of a processor, and opportunistically adjusts frequency and/or power supply voltage of that core without the core clocking source (e.g., PLL of that core) losing lock when the PCU 5510 and/or PMIC 5512 determines that the core is operating below a target performance level. For example, if a core is drawing current from a power supply rail less than a total current allocated for that core or processor 5504, then PCU 5510 and/or PMIC 5512 can temporality increase the power draw for that core or processor 5504 (e.g., by increasing clock frequency and/or power supply voltage level) so that the core or processor 5504 can perform at higher performance level. As such, voltage and/or frequency can be increased temporality for processor 5504 without violating product reliability.

In an example, PCU 5510 and/or PMIC 5512 may perform power management operations, e.g., based at least in part on receiving measurements from power measurement circuitries 5542, temperature measurement circuitries 5540, charge level of battery 5518, and/or any other appropriate information that may be used for power management. To that end, PMIC 5512 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 5510 and/or PMIC 5512 in at least one embodiment to allow PCU 5510 and/or PMIC 5512 to manage processor core energy at least in part based on value(s) detected by one or more of the sensors.

Also illustrated is an example software stack of device 5500 (although not all elements of the software stack are illustrated). Merely as an example, processors 5504 may execute application programs 5550, Operating System 5552, one or more Power Management (PM) specific application programs (e.g., generically referred to as PM applications 5558), and/or the like. PM applications 5558 may also be executed by the PCU 5510 and/or PMIC 5512. OS 5552 may also include one or more PM applications 5556a, 5556b, 5556c. The OS 5552 may also include various drivers 5554a, 5554b, 5554c, etc., some of which may be specific for power management purposes. In some embodiments, device 5500 may further comprise a Basic Input/output System (BIOS) 5520. BIOS 5520 may communicate with OS 5552 (e.g., via one or more drivers 5554), communicate with processors 5504, etc.

For example, one or more of PM applications 5558, 5556, drivers 5554, BIOS 5520, etc. may be used to implement power management specific tasks, e.g., to control voltage and/or frequency of various components of device 5500, to control wake-up state, sleep state, and/or any other appropriate power state of various components of device 5500, control battery power usage, charging of the battery 5518, features related to power saving operation, etc.

In some embodiments, battery 5518 is a Li-metal battery with a pressure chamber to allow uniform pressure on a battery. The pressure chamber is supported by metal plates (such as pressure equalization plate) used to give uniform pressure to the battery. The pressure chamber may include pressured gas, elastic material, spring plate, etc. The outer skin of the pressure chamber is free to bow, restrained at its edges by (metal) skin, but still exerts a uniform pressure on the plate that is compressing the battery cell. The pressure chamber gives uniform pressure to battery, which is used to enable high-energy density battery with, for example, 20% more battery life.

In some embodiments, battery 5518 includes hybrid technologies. For example, a mix of high energy density charge (e.g., Li-Ion batteries) carrying device(s) and low energy density charge carrying devices (e.g., supercapacitor) are used as batteries or storage devices. In some embodiments, a controller (e.g., hardware, software, or a combination of them) is used analyze peak power patterns and minimizes the impact to overall lifespan of high energy density charge carrying device-based battery cells while maximizing service time for peak power shaving feature. The controller may be part of battery 5518 or part of p-unit 5510b.

In some embodiments, pCode executing on PCU 5510a/b has a capability to enable extra compute and telemetries resources for the runtime support of the pCode. Here pCode refers to a firmware executed by PCU 5510a/b to manage performance of the SoC 5501. For example, pCode may set frequencies and appropriate voltages for the processor. Part of the pCode are accessible via OS 5552. In various embodiments, mechanisms and methods are provided that dynamically change an Energy Performance Preference (EPP) value based on workloads, user behavior, and/or system conditions. There may be a well-defined interface between OS 5552 and the pCode. The interface may allow or facilitate the software configuration of several parameters and/or may provide hints to the pCode. As an example, an EPP parameter may inform a pCode algorithm as to whether performance or battery life is more important.

This support may be done as well by the OS 5552 by including machine-learning support as part of OS 5552 and either tuning the EPP value that the OS hints to the hardware (e.g., various components of SoC 5501) by machine-learning prediction, or by delivering the machine-learning prediction to the pCode in a manner similar to that done by a Dynamic Tuning Technology (DTT) driver. In this model, OS 5552 may have visibility to the same set of telemetries as are available to a DTT. As a result of a DTT machine-learning hint setting, pCode may tune its internal algorithms to achieve optimal power and performance results following the machine-learning prediction of activation type. The pCode as example may increase the responsibility for the processor utilization change to enable fast response for user activity, or may increase the bias for energy saving either by reducing the responsibility for the processor utilization or by saving more power and increasing the performance lost by tuning the energy saving optimization. This approach may facilitate saving more battery life in case the types of activities enabled lose some performance level over what the system can enable. The pCode may include an algorithm for dynamic EPP that may take the two inputs, one from OS 5552 and the other from software such as DTT, and may selectively choose to provide higher performance and/or responsiveness. As part of this method, the pCode may enable in the DTT an option to tune its reaction for the DTT for different types of activity.

In some embodiments, pCode improves the performance of the SoC in battery mode. In some embodiments, pCode allows drastically higher SoC peak power limit levels (and thus higher Turbo performance) in battery mode. In some embodiments, pCode implements power throttling and is part of Intel's Dynamic Tuning Technology (DTT). In various embodiments, the peak power limit is referred to PL4. However, the embodiments are applicable to other peak power limits. In some embodiments, pCode sets the Vth threshold voltage (the voltage level at which the platform will throttle the SoC) in such a way as to prevent the system from unexpected shutdown (or black screening). In some embodiments, pCode calculates the Psoc,pk SoC Peak Power Limit (e.g., PL4), according to the threshold voltage (Vth). These are two dependent parameters, if one is set, the other can be calculated. pCode is used to optimally set one parameter (Vth) based on the system parameters, and the history of the operation. In some embodiments, pCode provides a scheme to dynamically calculate the throttling level (Psoc, th) based on the available battery power (which changes slowly) and set the SoC throttling peak power (Psoc, th). In some embodiments, pCode decides the frequencies and voltages based on Psoc, th. In this case, throttling events have less negative effect on the SoC performance Various embodiments provide a scheme which allows maximum performance (Pmax) framework to operate.

In some embodiments, VR 5514 includes a current sensor to sense and/or measure current through a high-side switch of VR 5514. In some embodiments the current sensor uses an amplifier with capacitively coupled inputs in feedback to sense the input offset of the amplifier, which can be compensated for during measurement. In some embodiments, the amplifier with capacitively coupled inputs in feedback is used to operate the amplifier in a region where the input common-mode specifications are relaxed, so that the feedback loop gain and/or bandwidth is higher. In some embodiments, the amplifier with capacitively coupled inputs in feedback is used to operate the sensor from the converter input voltage by employing high-PSRR (power supply rejection ratio) regulators to create a local, clean supply voltage, causing less disruption to the power grid in the switch area. In some embodiments, a variant of the design can be used to sample the difference between the input voltage and the controller supply, and recreate that between the drain voltages of the power and replica switches. This allows the sensor to not be exposed to the power supply voltage. In some embodiments, the amplifier with capacitively coupled inputs in feedback is used to compensate for power delivery network related (PDN-related) changes in the input voltage during current sensing.

Some embodiments use three components to adjust the peak power of SoC 5501 based on the states of a USB TYPE-C device 5529. These components include OS Peak Power Manager (part of OS 5552), USB TYPE-C Connector Manager (part of OS 5552), and USB TYPE-C Protocol Device Driver (e.g., one of drivers 5554$a$, 5554$b$, 5554$c$). In some embodiments, the USB TYPE-C Connector Manager sends a synchronous request to the OS Peak Power Manager when a USB TYPE-C power sink device is attached or detached from SoC 5501, and the USB TYPE-C Protocol Device Driver sends a synchronous request to the Peak Power Manager when the power sink transitions device state. In some embodiments, the Peak Power Manager takes power budget from the CPU when the USB TYPE-C connector is attached to a power sink and is active (e.g., high power device state). In some embodiments, the Peak Power Manager gives back the power budget to the CPU for performance when the USB TYPE-C connector is either detached or the attached and power sink device is idle (lowest device state).

In some embodiments, logic is provided to dynamically pick the best operating processing core for BIOS power-up flows and sleep exit flows (e.g., S3, S4, and/or S5). The selection of the bootstrap processor (BSP) is moved to an early power-up time instead of a fixed hardware selection at any time. For maximum boot performance, the logic selects the fastest capable core as the BSP at an early power-up time. In addition, for maximum power saving, the logic selects the most power efficient core as the BSP. Processor or switching for selecting the BSP happens during the boot-up as well as power-up flows (e.g., S3, S4, and/or S5 flows).

In some embodiments, the memories herein are organized in multi-level memory architecture and their performance is governed by a decentralized scheme. The decentralized scheme includes p-unit 5510 and memory controllers. In some embodiments, the scheme dynamically balances a number of parameters such as power, thermals, cost, latency and performance for memory levels that are progressively further away from the processor in platform 5500 based on how applications are using memory levels that are further away from processor cores. In some examples, the decision making for the state of the far memory (FM) is decentralized. For example, a processor power management unit (p-unit), near memory controller (NMC), and/or far memory host controller (FMHC) makes decisions about the power and/or performance state of the FM at their respective levels. These decisions are coordinated to provide the most optimum power and/or performance state of the FM for a given time. The power and/or performance state of the memories adaptively change to changing workloads and other parameters even when the processor(s) is in a particular power state.

In some embodiments, a hardware and software coordinated processor power state policy (e.g., policy for C-state) is implemented that delivers optimal power state selection by taking in to account the performance and/or responsiveness needs of thread expected to be scheduled on the core entering idle, to achieve improved instructions per cycle (IPC) and performance for cores running user critical tasks. The scheme provides the ability to deliver responsiveness gains for important and/or user-critical threads running on a system-on-chip. P-unit 5510 which coupled to the plurality of processing cores, receives a hint from operating system 5552 indicative of a bias towards a power state or performance state for at least one of the processing cores of the plurality of processing cores based on a priority of a thread in context switch.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "analog signal" is any continuous signal for which the time varying feature (variable) of the signal is a representation of some other time varying quantity, i.e., analogous to another time varying signal.

The term "digital signal" is a physical signal that is a representation of a sequence of discrete values (a quantified discrete-time signal), for example of an arbitrary bit stream, or of a digitized (sampled and analog-to-digital converted) analog signal.

The term "scaling" generally refers to converting a design (schematic and layout) from one process technology to another process technology and may be subsequently being reduced in layout area. In some cases, scaling also refers to upsizing a design from one process technology to another process technology and may be subsequently increasing layout area. The term "scaling" generally also refers to downsizing or upsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

Here the term "die" generally refers to a single continuous piece of semiconductor material (e.g. silicon) where transistors or other components making up a processor core may reside. Multi-core processors may have two or more processors on a single die, but alternatively, the two or more processors may be provided on two or more respective dies. Each die has a dedicated power controller or power control unit (p-unit) power controller or power control unit (p-unit) which can be dynamically or statically configured as a supervisor or supervisee. In some examples, dies are of the same size and functionality i.e., symmetric cores. However, dies can also be asymmetric. For example, some dies have different size and/or function than other dies. Each processor may also be a dielet or chiplet.

Here the term "dielet" or "chiplet" generally refers to a physically distinct semiconductor die, typically connected to an adjacent die in a way that allows the fabric across a die boundary to function like a single fabric rather than as two distinct fabrics. Thus at least some dies may be dielets. Each dielet may include one or more p-units which can be dynamically or statically configured as a supervisor, supervisee or both.

Here the term "fabric" generally refers to communication mechanism having a known set of sources, destinations, routing rules, topology and other properties. The sources and destinations may be any type of data handling functional unit such as power management units. Fabrics can be two-dimensional spanning along an x-y plane of a die and/or three-dimensional (3D) spanning along an x-y-z plane of a stack of vertical and horizontally positioned dies. A single fabric may span multiple dies. A fabric can take any topology such as mesh topology, star topology, daisy chain topology. A fabric may be part of a network-on-chip (NoC) with multiple agents. These agents can be any functional unit.

Here, the term "processor core" generally refers to an independent execution unit that can run one program thread at a time in parallel with other cores. A processor core may include a dedicated power controller or power control unit (p-unit) which can be dynamically or statically configured as a supervisor or supervisee. This dedicated p-unit is also referred to as an autonomous p-unit, in some examples. In some examples, all processor cores are of the same size and functionality i.e., symmetric cores. However, processor cores can also be asymmetric. For example, some processor cores have different size and/or function than other processor cores. A processor core can be a virtual processor core or a physical processor core.

Here, the term "interconnect" refers to a communication link, or channel, between two or more points or nodes. It may comprise one or more separate conduction paths such as wires, vias, waveguides, passive components, and/or active components. It may also comprise a fabric. In some embodiments, a p-unit is coupled to an OS via an interface.

Here the term "interface" generally refers to software and/or hardware used to communicate with an interconnect. An interface may include logic and I/O driver/receiver to send and receive data over the interconnect or one or more wires.

Here the term "domain" generally refers to a logical or physical perimeter that has similar properties (e.g., supply voltage, operating frequency, type of circuits or logic, and/or workload type) and/or is controlled by a particular agent. For example, a domain may be a group of logic units or function units that are controlled by a particular supervisor. A domain may also be referred to an Autonomous Perimeter (AP). A domain can be an entire system-on-chip (SoC) or part of the SoC, and is governed by a p-unit.

Here the term "supervisor" generally refers to a power controller, or power management, unit (a "p-unit"), which monitors and manages power and performance related parameters for one or more associated power domains, either alone or in cooperation with one or more other p-units. Power/performance related parameters may include but are not limited to domain power, platform power, voltage, voltage domain current, die current, load-line, temperature, device latency, utilization, clock frequency, processing efficiency, current/future workload information, and other parameters. It may determine new power or performance parameters (limits, average operational, etc.) for the one or more domains. These parameters may then be communicated to supervisee p-units, or directly to controlled or monitored entities such as VR or clock throttle control registers, via one or more fabrics and/or interconnects. A supervisor learns of the workload (present and future) of one or more dies, power measurements of the one or more dies, and other parameters (e.g., platform level power boundaries) and determines new power limits for the one or more dies. These power limits are then communicated by supervisor p-units to the supervisee p-units via one or more fabrics and/or interconnect. In examples where a die has one p-unit, a supervisor (Svor) p-unit is also referred to as supervisor die.

Here the term "supervisee" generally refers to a power controller, or power management, unit (a "p-unit"), which monitors and manages power and performance related parameters for one or more associated power domains, either alone or in cooperation with one or more other p-units and receives instructions from a supervisor to set power and/or performance parameters (e.g., supply voltage, operating frequency, maximum current, throttling threshold, etc.) for its associated power domain. In examples where a die has one p-unit, a supervisee (Svee) p-unit may also be referred to as a supervisee die. Note that a p-unit may serve either as a Svor, a Svee, or both a Svor/Svee p-unit.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process. The examples can be combined in any combinations. For example, example 4 can be combined with example 2.

Example 1: An apparatus comprising: a pseudorandom generator to generate a frequency hopping time sequence; a frequency synthesizer coupled to the pseudorandom generator, the frequency synthesizer to receive an input clock and to generate an output clock; and a modulator to modulate a code, indicative of one or more keys, on to the input clock via the frequency hopping time sequence.

Example 2: The apparatus of example 1, wherein the one or more keys are used to gate or un-gate a circuitry.

Example 3: The apparatus of example 2, wherein the circuitry includes a clock gating logic or a power gating circuitry.

Example 4: The apparatus of example 3, wherein the one or more keys includes a first key and a second key, wherein the clock gating logic includes: a sequential unit to receive a local clock and an enable; a first XOR or XNOR gate to receive an output of the sequential unit and the first key; a second XOR or XNOR gate to receive the local clock and the second key; and a AND gate or a NAND gate coupled to an output of the first XOR or XNOR gate and an output of the second XOR or XNOR gate.

Example 5: The apparatus of example 1 comprises: a first channel to transmit the frequency hopping time sequence to an intellectual property (IP) block; and a second channel to transmit the output clock to the IP block.

Example 6: The apparatus of example 5, wherein the IP block include a decoder to extract the one or more keys from the output clock.

Example 7: The apparatus of example 5, wherein the IP block includes fuses to store the one or more keys and/or the frequency hopping time sequence.

Example 8: The apparatus of example 1, wherein the input clock undergoes spread-spectrum using the frequency hopping time sequence.

Example 9: The apparatus of example 1, wherein the frequency hopping time sequence is a low frequency hopping time sequence.

Example 10: The apparatus of example 1, wherein the frequency synthesizer comprises a phase locked loop or a frequency locked loop.

Example 11: The apparatus of example 1, comprises a demodulator to extract the one or more keys from a clock generated by the frequency synthesizer.

Example 12: An apparatus comprising: a first channel to receive a frequency hopping time sequence generated by a pseudorandom generator to generate a frequency hopping time sequence; and a second channel to receive an output from a frequency synthesizer, wherein an input clock of the frequency synthesizer is modulated with a code via the frequency hopping time sequence, wherein the code is indicative of one or more keys.

Example 13: The apparatus of example 11 comprises a decoder to extract the one or more keys using the frequency hopping time sequence.

Example 14: The apparatus of example 11 comprises a circuitry which is gated or un-gated according to the one or more keys.

Example 15: The apparatus of example 14, wherein the circuitry includes a clock gating logic or a power gating logic.

Example 16: The apparatus of example 15, wherein the one or more keys includes a first key and a second key, wherein the clock gating logic includes: a sequential unit to receive a local clock and an enable; a first XOR or XNOR gate to receive an output of the sequential unit and the first key; a second XOR or XNOR gate to receive the local clock and the second key; and a AND gate or a NAND gate coupled to an output of the first XOR or XNOR gate and an output of the second XOR or XNOR gate.

Example 17: The apparatus of example 11 comprising fuses to store the one or more keys and/or the frequency hopping time sequence.

Example 18: The apparatus of example 11, wherein the input clock undergoes spread-spectrum using the frequency hopping time sequence.

Example 19: The apparatus of example 11, wherein the frequency hopping time sequence is a low frequency hopping time sequence.

Example 20: A package comprising: a substrate; a processor on the substrate; and an integrated circuit on the substrate, the integrated circuit comprising a root-of-trust which includes: a pseudorandom generator to generate a frequency hopping time sequence; a frequency synthesizer coupled to the pseudorandom generator, the frequency synthesizer to receive an input clock and to generate an output clock; and a modulator to modulate a code, indicative of one or more keys, on to the input clock via the frequency hopping time sequence, wherein the frequency hopping time sequence and the output clock are sent to the processor.

Example 21: The package of example 20, wherein the processor includes a clock gating logic, wherein the one or more keys includes a first key and a second key, wherein the clock gating logic includes: a sequential unit to receive a local clock and an enable; a first XOR or XNOR gate to receive an output of the sequential unit and the first key; a second XOR or XNOR gate to receive the local clock and the second key; and a AND gate or a NAND gate coupled to an output of the first XOR or XNOR gate and an output of the second XOR or XNOR gate.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus comprising:
   a pseudorandom generator to generate a frequency hopping time sequence;
   a frequency synthesizer coupled to the pseudorandom generator, the frequency synthesizer to receive an input clock and to generate an output clock; and
   a modulator to modulate a code, indicative of one or more keys, on to the input clock via the frequency hopping time sequence.

2. The apparatus of claim 1, wherein the one or more keys are used to gate or un-gate a circuitry.

3. The apparatus of claim 2, wherein the circuitry includes a clock gating logic or a power gating circuitry.

4. The apparatus of claim 3, wherein the one or more keys includes a first key and a second key, wherein the clock gating logic includes:
   a sequential unit to receive a local clock and an enable;
   a first XOR or XNOR gate to receive an output of the sequential unit and the first key;
   a second XOR or XNOR gate to receive the local clock and the second key; and
   a AND gate or a NAND gate coupled to an output of the first XOR or XNOR gate and an output of the second XOR or XNOR gate.

5. The apparatus of claim 1 comprises:
   a first channel to transmit the frequency hopping time sequence to an intellectual property (IP) block; and
   a second channel to transmit the output clock to the IP block.

6. The apparatus of claim 5, wherein the IP block include a decoder to extract the one or more keys from the output clock.

7. The apparatus of claim 5, wherein the IP block includes fuses to store the one or more keys and/or the frequency hopping time sequence.

8. The apparatus of claim 1, wherein the input clock undergoes spread-spectrum using the frequency hopping time sequence.

9. The apparatus of claim 1, wherein the frequency hopping time sequence is a low frequency hopping time sequence.

10. The apparatus of claim 1, wherein the frequency synthesizer comprises a phase locked loop or a frequency locked loop.

11. The apparatus of claim 1, comprises a demodulator to extract the one or more keys from a clock generated by the frequency synthesizer.

12. An apparatus comprising:
    a first channel to receive a frequency hopping time sequence generated by a pseudorandom generator to generate a frequency hopping time sequence; and
    a second channel to receive an output from a frequency synthesizer, wherein an input clock of the frequency synthesizer is modulated with a code via the frequency hopping time sequence, wherein the code is indicative of one or more keys.

13. The apparatus of claim 12 comprises a decoder to extract the one or more keys using the frequency hopping time sequence.

14. The apparatus of claim 12 comprises a circuitry which is gated or un-gated according to the one or more keys.

15. The apparatus of claim 14, wherein the circuitry includes a clock gating logic or a power gating logic.

16. The apparatus of claim 15, wherein the one or more keys includes a first key and a second key, wherein the clock gating logic includes:
    a sequential unit to receive a local clock and an enable;
    a first XOR or XNOR gate to receive an output of the sequential unit and the first key;
    a second XOR or XNOR gate to receive the local clock and the second key; and
    a AND gate or a NAND gate coupled to an output of the first XOR or XNOR gate and an output of the second XOR or XNOR gate.

17. The apparatus of claim 12 comprising fuses to store the one or more keys and/or the frequency hopping time sequence.

18. The apparatus of claim 12, wherein the input clock undergoes spread-spectrum using the frequency hopping time sequence.

19. The apparatus of claim 12, wherein the frequency hopping time sequence is a low frequency hopping time sequence.

20. A package comprising:
    a substrate;
    a processor on the substrate; and
    an integrated circuit on the substrate, the integrated circuit comprising a root-of-trust which includes:
      a pseudorandom generator to generate a frequency hopping time sequence;
      a frequency synthesizer coupled to the pseudorandom generator, the frequency synthesizer to receive an input clock and to generate an output clock; and
      a modulator to modulate a code, indicative of one or more keys, on to the input clock via the frequency hopping time sequence, wherein the frequency hopping time sequence and the output clock are sent to the processor.

21. The package of claim 20, wherein the processor includes a clock gating logic, wherein the one or more keys includes a first key and a second key, wherein the clock gating logic includes:
    a sequential unit to receive a local clock and an enable;
    a first XOR or XNOR gate to receive an output of the sequential unit and the first key;

a second XOR or XNOR gate to receive the local clock and the second key; and
a AND gate or a NAND gate coupled to an output of the first XOR or XNOR gate and an output of the second XOR or XNOR gate.

\* \* \* \* \*